(12) United States Patent
Tazuma

(10) Patent No.: US 7,493,414 B2
(45) Date of Patent: Feb. 17, 2009

(54) APPARATUS AND METHODS RELATING TO WEB BROWSER REDIRECTION

(75) Inventor: Stanley K. Tazuma, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 734 days.

(21) Appl. No.: 11/109,273

(22) Filed: Apr. 19, 2005

(65) Prior Publication Data

US 2005/0235044 A1   Oct. 20, 2005

Related U.S. Application Data

(60) Provisional application No. 60/563,859, filed on Apr. 20, 2004, provisional application No. 60/563,889, filed on Apr. 20, 2004.

(51) Int. Cl.
*G06F 15/173* (2006.01)
(52) U.S. Cl. .................................................. 709/239
(58) Field of Classification Search ................. 709/239, 709/223, 230, 238
See application file for complete search history.

(56) References Cited

U.S. PATENT DOCUMENTS

| | | | |
|---|---|---|---|
| 6,130,892 A | 10/2000 | Short et al. | |
| 6,226,677 B1 | 5/2001 | Slemmer | |
| 6,591,306 B1 | 7/2003 | Redlich | |
| 6,636,894 B1 | 10/2003 | Short et al. | |
| 6,754,183 B1 | 6/2004 | Razavi et al. | |
| 6,934,754 B2 * | 8/2005 | West et al. | 709/225 |
| 6,985,479 B2 * | 1/2006 | Leung et al. | 370/352 |
| 7,272,853 B2 * | 9/2007 | Goodman et al. | 726/13 |
| 2002/0112076 A1 | 8/2002 | Rueda et al. | |
| 2005/0235044 A1 * | 10/2005 | Tazuma | 709/217 |
| 2006/0031394 A1 * | 2/2006 | Tazuma | 709/217 |
| 2007/0204051 A1 | 8/2007 | Zhang | |

FOREIGN PATENT DOCUMENTS

| | | |
|---|---|---|
| EP | 0 890 907 A1 | 1/1999 |
| EP | 1 111 874 A1 | 6/2001 |
| JP | 2000099429 | 4/2000 |
| WO | WO 99/23571 | 5/1999 |
| WO | WO 99/38303 | 7/1999 |

(Continued)

OTHER PUBLICATIONS

Transparent Proxy with Linux and Squid mini-HOWTO, (http://www.faqs.org/docs/Linux-mini/TransparentProxy.html), Daniel Kiracofe, v1.15, Aug. 2002, 9 pages.

(Continued)

*Primary Examiner*—David Y Eng
(74) *Attorney, Agent, or Firm*—Harness, Dickey & Pierce, P.L.C.

(57) ABSTRACT

A method of redirecting a browser in a network. A fake IP address is provided to the browser in response to an attempt to resolve a non-resolvable DNS query by the browser for a destination address. The method also includes detecting a web request by the browser sent to the fake IP address, and redirecting the browser to a redirect address based on the detecting. Web requests sent to valid IP addresses may also be detected and redirected.

17 Claims, 12 Drawing Sheets

FOREIGN PATENT DOCUMENTS

| WO | WO 00/14987 | 3/2000 |
|---|---|---|
| WO | WO 00/63806 | 10/2000 |
| WO | WO 03/019894 A2 | 3/2003 |

OTHER PUBLICATIONS

International Search Report (Sep. 13, 2005), International Application No. PCT/US2005/013314.

International Search Report (Sep. 7, 2005), International Application No. PCT/US2005/013427.

Charles E. Perkins, Mobile-IP, Ad-Hoc Networking, and Nomadicity, Aug. 21, 1996.

Cooper, et al., Web Proxy Auto-Discovery Protocol, Nov. 15, 2000.

Sharpe, Richard, "Just what is SMB?" Oct. 8, 2002.

* cited by examiner

APPARATUS AND METHODS RELATING TO WEB BROWSER REDIRECTION

CROSS-REFERENCE TO RELATED APPLICATIONS

This application claims the benefit of U.S. Provisional Application No. 60/563,859 filed on Apr. 20, 2004, and U.S. Provisional Application No. 60/563,889 filed on Apr. 20, 2004, the disclosures of which are incorporated herein by reference.

FIELD OF THE INVENTION

The present invention relates generally to computer networks, and more particularly (but not exclusively) to apparatus and methods for performing web browser redirection.

BACKGROUND OF THE INVENTION

Web browser redirection can be used to intercept an access request to load an original destination address (e.g., uniform resource locator (URL) or web address, etc.) and then redirect the web browser, for example, to a specific portal or local web page. The portal page may be hosted on a gateway device or on a server co-located with a gateway device. The portal page may be maintained, for example, by a service provider, business partner, or enterprise network. At the portal page, local content may be displayed. Additionally or alternatively, a login to a network may be initiated by having a user enter login information (e.g., username, password, etc.) to be authenticated and authorized access to the network.

Redirection, however, is not always possible, especially when a browser attempts to load a URL with a nonpublic domain name that does not resolve to an Internet Protocol (IP) address on the public Internet, or when a browser attempts to load an explicit IP address that is not publicly accessible (e.g., an IP address of a secure intranet, etc.). Web browser redirection systems typically save the original URL so that relatively immediately after login, the web browser can be redirected to the original URL. This post-login redirect will typically be invalid, however, if the original URL is not publicly reachable. Additionally, a domain name may be public and resolvable to an IP address, but an upstream network infrastructure (e.g., destination server upstream of a gateway device, etc.) may be down and thus unavailable. In such case, redirection will not function in a system that requires the upstream network infrastructure to be in an "always-up" condition.

SUMMARY OF THE INVENTION

The present invention, in one implementation, is directed to a method of redirecting a browser in a network. A fake IP address is provided to the browser in response to an attempt to resolve a non-resolvable DNS query by the browser for a destination address. The method also includes detecting a web request by the browser sent to the fake IP address, and redirecting the browser to a redirect address based on the detecting.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
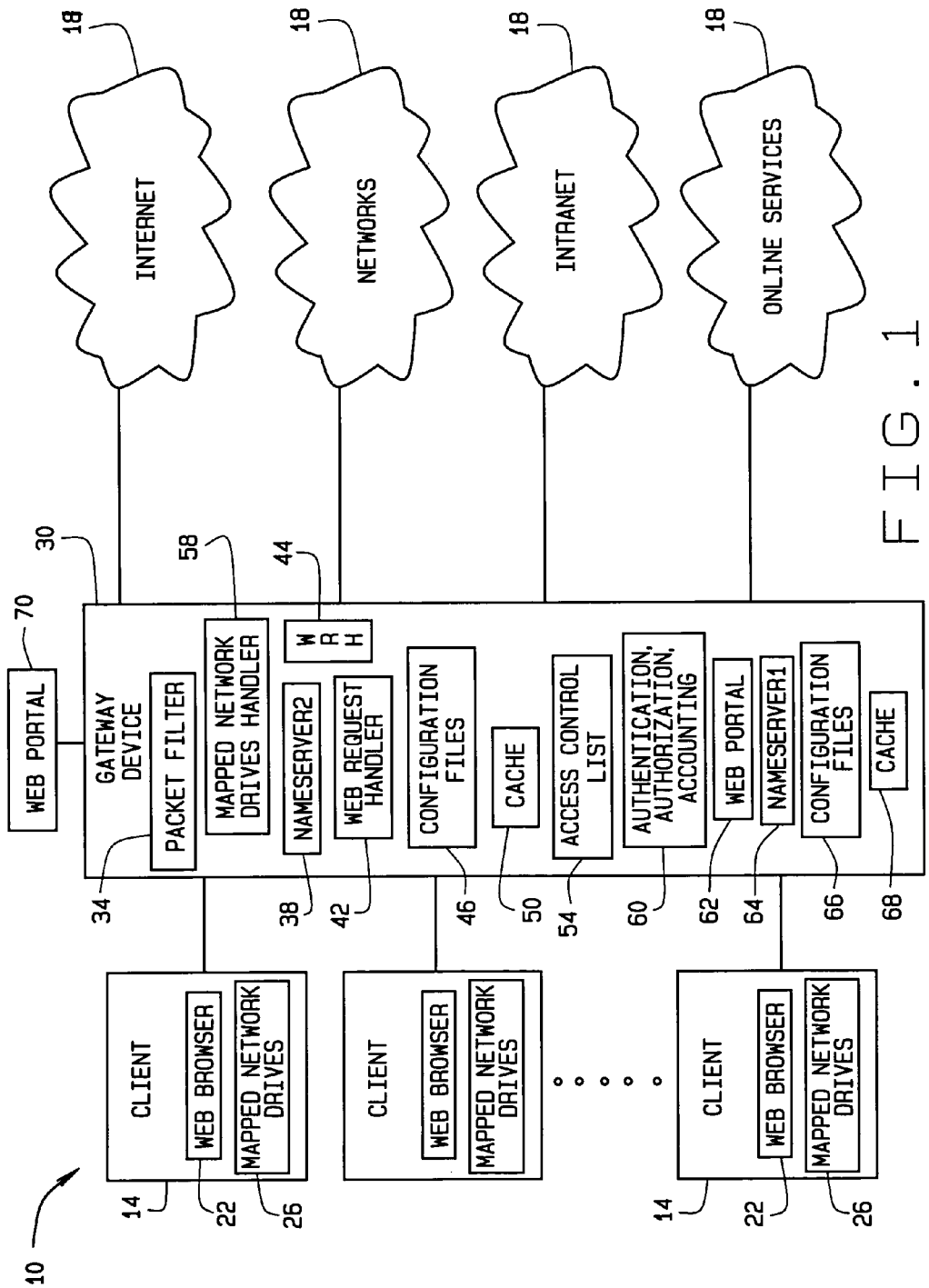
FIG. 1 is a block diagram of an exemplary computer system according to one implementation of the invention.

The following description of the preferred embodiments is merely exemplary in nature and is in no way intended to limit the invention, its application, or uses. According to one aspect, the invention provides systems and methods capable of improving web browser redirection. As described below, enablement and support of web browser redirection can be improved, for example, in situations wherein a domain name is non-resolvable and/or upstream network infrastructure is unavailable. Improvements in accordance with principles of the present invention make it possible to provide browser redirection in a more user-friendly manner than possible using current redirection methods. In various implementations, a fake address may be provided to a network client in response to a web access request, to enable redirection of the browser, for example, where the domain name is non-resolvable and/or upstream network infrastructure is unavailable.

In some configurations, browser redirection is implemented in connection with transparent handling of web client proxy configurations by a network gateway device. A plurality of web browsers may be provided with access to the network via the network gateway device. The browsers can be installed on one or more clients of the network gateway device and can have a plurality of different proxy settings. Packet redirection and proxy server components may be used to enable each unique proxy mode configuration to make web requests.

Various implementations of the invention are particularly suitable for mobile networks (e.g., network on a mobile platform) in which service to the upstream network is sometimes unavailable or intermittently down. An example of a mobile network is the CONNEXION BY BOEING$^{SM}$ system where satellite-based or other form of wireless connectivity is provided between a terrestrial based wide area network (e.g., the Internet) and personal electronic devices (PEDs) of users onboard a commercial aircraft.

It will be appreciated that the systems and methods described herein can be implemented on virtually any form of mobile platform such as a ship, train, bus, rotorcraft, or any other form of land, sea, or air/space based vehicle that needs to provide connectivity with an off-platform network or server. Further, it will be appreciated that the systems and methods described herein should not be limited to use with network gateway devices carried on mobile platforms, as the invention can be applied to fixed or stationary networks and gateway devices as well.

As used herein, the term "domain name" shall not be construed to limit the invention to just the Internet. "Domain name" includes and generally refers to a name in any name-to-address mapping network service, regardless of whether the network comprises the Internet, an intranet, a local area network (LAN), a wide area network (WAN), a combination thereof, etc. Unless described otherwise, the terms "web browser" or "browser" are used to refer to any software capable at least of making Internet requests using the Internet standard HTTP protocol, including but not limited to software which fits the traditional definition of a web browser, such as Microsoft's InternetExplorer® ("IE") or Netscape®. Examples of other software components that can make such requests include: ICQ® (chat software), RealAudio® (streaming media software), certain advertising components, anti-virus update software, Microsoft Messenger®, to name just a few.

Before explaining in detail various preferred embodiments of the present invention, an overview will be provided that describes a typical gateway device and various phases through which a user of an access-controlled network including a gateway device may progress, such as pre-login, login, post-login, in-VPN (Virtual Private Network), and logout. This overview is provided as an aid in providing a more complete understanding and not for purposes of limitation.

Gateway Device

A gateway device typically serves as an interface between two segments of a network. In its simplest form, a gateway device may behave like a router, which forwards packets from one segment to the other. Some gateways provide access controls that limit access from one side of the gateway to the other. A gateway typically provides asymmetrical access controls. One side of a gateway may commonly be called the "inside network", the other side the "outside network". Other descriptive terms include "local network", which generally corresponds to an "inside network", and "upstream network", which generally refers to an "outside network". Yet another descriptive term, "foreign network", may be applied to networks in various environments (e.g., hotel rooms, coffee shops, book stores, etc.) which are made available through a gateway device to customers who bring their own laptops or other electronic devices. From a user's viewpoint, local network access services controlled by a gateway device may be described as a "foreign network" because the network configuration and behavior may be unlike that exhibited by the user's home network.

A gateway device may also be deployed in environments in which access from the local network to the upstream network is controlled. Users may be required to be authorized first, often after paying a fee, before being able to access the upstream network. The gateway device may act as a server, hosting a web portal, authorization subsystem, and/or other software components. Optionally, some of these components could be deployed on other computing devices either co-located with the gateway device, on the local network, or upstream from the gateway device.

Phases—Pre-Login, Login, Post-Login, In-VPN, Logout

While accessing or using an access-controlled network through a gateway device, a user may progress through several phases, such as pre-login, login, post-login, in-VPN (Virtual Private Network), and logout. During a pre-login phase, the user's client computer usually has restricted access. Depending on the service provider and/or configuration, some free access may be allowed, and/or there may be some web content locally hosted and freely available. To gain full access to the upstream network, typically the user has to complete an authorization process through a login web page.

During the login phase, several client and server operations are typically performed to initiate and complete authentication and authorization processes. The login phase usually involves at least entering a username and password and may also involve registration and payment authorization. If the username and password are accepted by an AAA (authentication, authorization, and accounting) subsystem, the login typically is successful.

Post-login generally refers to a period in which full access has been authorized for the user. During a post-login phase, a user may choose to establish a virtual private network (VPN) session with a corporate or other network using a public network such as the Internet. There are many different types of VPN software and different methods for handling a switch to another network. Any problems that VPN users may experience tend to occur at the beginning of the in-VPN phase and/or just after exiting the in-VPN phase.

In a logout phase, a client and server may perform several operations to complete a logout. In some cases, however, a user may get logged out automatically by the server. To complete a logout, various components on the gateway device may be configured to disable access to the upstream network by the unauthorized user's client computer, while still allowing access by the other authorized users.

Web Browser Redirection—Two Types

Web browser redirection generally refers to two processes, Hyper-Text Transfer Protocol (HTTP) redirection and Internet Protocol (IP) redirection. Accordingly, web browser redirection can include HTTP redirection and/or IP redirection. A single HTTP request can undergo either or both forms of redirection depending on a given application. An HTTP redirect involves the use of standard HTTP protocol headers and/or directives that cause a client browser to load a different URL than the URL originally requested by the browser. An IP redirection involves using a packet filter to manipulate addresses. A common form of IP redirection is to change an original destination address to another address in such a way that the client is not aware of the change.

Redirection, however, is not always possible, for example, when a browser attempts to load a URL with a nonpublic domain name that does not resolve to an IP address on the public Internet, or when a browser attempts to load an explicit IP address that is not publicly accessible. In addition, web browser redirection systems typically save a destination URL originally loaded by a browser so that, for example, immediately after a login, the browser can be redirected to the original URL. A post-login redirect will be invalid, however, if the original URL is not publicly reachable. Further, the domain name may be public and resolvable to an IP address, but upstream network infrastructure may be unavailable. In such case, redirection will not function as intended where it depends on the upstream network infrastructure being in an "always-up" condition. Accordingly, various implementations of the present invention advantageously enable and support web browser redirection when the domain name is non-resolvable and/or network infrastructure upstream of the gateway device is unavailable, as described below. Such implementations of browser redirection can be especially useful in relation to detection and handling of proxy configurations for browsers using a network gateway device to access an upstream network, also as described below.

Overview of System and Method

Referring now to FIG. 1, an exemplary computer system 10 is depicted in block diagram form in accordance with the principles of this invention. As shown, the system 10 includes a plurality of clients or computers 14 that access a computer network in order to gain access to one or more networks and online services 18. Client 14 can be any computing device capable of making access requests to network devices (e.g., servers, etc.), such as Hyper-Text Transfer Protocol (HTTP) requests, Domain Name Service (DNS) queries, web requests, IP requests, etc. Exemplary clients can include various desktop computers, laptop computers, personal digital assistants (PDAs), personal electronic devices (PEDs), other suitable computing devices, from a wide variety of manufacturers each potentially having different proxy configurations, each running different browsers, as well as different versions of similar browsers.

Each client 14 may include one or more web browsers 22. A browser 22 may serve as a user interface to the gateway device 30. Each client 14 may also include Mapped Network Drives (MND) 26. Generally, the MND feature allows a user to map a network directory or file system to a drive letter (e.g., G:, H:, etc.) and then have that mapping re-established when the computer restarts. MND is a feature available on Microsoft's Windows® operating systems, although not every client computer will make use of it. MND features may be accessible when a client is connected to a corporate network, whether physically, wirelessly, or virtually through a virtual private network (VPN) connection.

By way of background, MND client requests have been observed on Windows® platforms when Microsoft's InternetExplorer® browser is in use. A MND configuration on a client, if any, is normally separate from a browser on the client and is part of the operating system configuration. On Windows®, MND features may be configured using a standard file browser, e.g., Explorer. As MND features are typically not part of a default configuration, a user normally has to decide to configure the user's client with MND. Recent versions of Windows® provide users the choice of configuring network-drive-shortcuts and/or mapped network drives.

Mapped network drives automount process (MNDAP) refers to a sequence of client requests (and/or server replies if there is a compatible file server or spoofing software as described below) that occur when a MND client is trying to mount network drives. While MNDAP is usually a multi-step process, MNDAP primarily involves using SMB/TCP (Server Management Block over Transmission Control Protocol) requests from client to server. SMB is a name of a file server protocol that Microsoft® uses for network file sharing.

MNDAP can be triggered by non-web-browser activities, as MND may be required to satisfy a file or directory request by any application. For example, a user may have a Windows desktop shortcut to a network file or drive, and double-clicking on that shortcut will result in the MNDAP being started perhaps just for the MND identified in that shortcut.

MND client requests for configured MND may begin when a new InternetExplorer® process first makes some type of web request (if a browser is already running when a network connection is established, the MNDAP does not begin again). So if InternetExplorer® is set to start up with a blank page, MND client requests are not seen until the browser is first asked to load a URL. InternetExplorer® need not have any proxy settings enabled. Even with all proxy settings in InternetExplorer® disabled, MNDAP has been observed. MND client-server exchanges usually occur before any browser HTTP redirects occur.

With further reference to FIG. 1, the system 10 also includes a network gateway device 30. The gateway device 30 provides an interface between the clients 14 and the upstream network. Merely for convenience, the term "upstream network" generally refers to and includes the network infrastructure upstream from the gateway device 30. The upstream network could just as easily be a server. While the upstream network in FIG. 1 includes various components that reach the public Internet, this is not required as implementations of the invention are also applicable to any number of (i.e., one or more) suitable online services and networks (e.g., a local area network (LAN), a wide area network (WAN), an Intranet, the Internet, a combination thereof, etc.). Further, any number (i.e., one or more) of network destinations and devices may be operatively associated with or linked to the system 10 via any suitable means (e.g., modem, T-1, T-3, digital subscriber line (DSL), infrared, satellite, cable, etc.), including through yet other devices (e.g., routers, hubs, etc.), through yet other networks (e.g., LAN, WAN, Intranet, the Internet, etc.), etc.

While the gateway device 30 can be physically embodied in many different fashions, the gateway device 30 typically includes a controller and a memory device in which software is stored that defines the operational characteristics of the gateway device 30. Alternatively, the gateway device 30 can be embedded within another network device, such as an access controller or a router.

As shown in FIG. 1, the gateway device 30 includes various resources (e.g., software resources, data resources, hardware resources, etc.) that can be accessed by the gateway device 30 to carry out various operations. Such operations can include redirecting web browser requests and/or performing proxy mode handling as described below. The gateway device resources can include Packet Filter 34, Nameserver2 38, Web Request Handler (WRH) 42 and WRH 44, Configuration Files 46, Cache 50, Access Control List 54, Mapped Network Drives Handler 58, Authentication, Authorization, and Accounting (AAA) component 60, one or more Web Portals 62, Nameserver1 64, Configuration Files 66, and Cache 68. Web Portal 62 can include local content and/or login pages. It should be noted that the foregoing named resources are exemplary only. Various functions described herein with reference to particular resources of the gateway device 30 could be performed by or with other or additional resources.

In some implementations, Nameserver2 38 includes custom-designed DNS server software residing on the gateway device 30. Packet Filter 34 includes software also residing on the gateway device 30 that includes rules such that query packets may be retargeted to the software components of Nameserver2 38. Web Request Handler 42 includes one or more software components to intercept destination address access requests from browsers and then determine how to handle and redirect the intercepted access requests. Access Control List 54 can include a list of domain name matching patterns that can be freely accessed in a pre-login phase, as further described below, without being redirected.

Packet filtering rules may be installed in Packet Filter 34 that provide for packet-level redirection. Logging of packet attributes also may be performed for particular request packets that match patterns of interest. In one implementation, a well-known, open source software program known as "Squid" is incorporated into WRH 42 and modified to provide some of the capabilities of WRH 42. The modified Squid software operates to intercept web requests and has an application program interface (API) that incorporates a redirect child process, called "urlredirector". Urlredirector, also a component within WRH 42, can determine whether a request is in direct mode or in proxy mode. Urlredirector also participates in performing access control by using ACL 54 to determine whether to allow a URL to be retrieved by a browser or to redirect the browser instead. Urlredirector recognizes when a proxy mode request is being handled and invokes software to support proxy mode handling. WRH 42 parses and extracts Packet Filter 34 log information to determine what original IP address and port number a client request was using.

While each resource 34 through 68 is shown in FIG. 1 as residing on the gateway device 30, this is not required. In other configurations, one or more of the resources may be external to the gateway device 30. For example, one or more of the resources can be embodied in computer readable program code stored in computer readable storage media external to the gateway device 30.

The computer system 10 can also include one or more Web Portals 70 co-located with the gateway device 30. Web Portal(s) 70 can be hosted on one or more servers or other network devices in communication with the gateway device 30.

The computer system 10 also may include one or more routers, switches, servers, bridges, etc., hierarchically configured to direct traffic to and from the various networks or network services 18. In this regard, the gateway device 30 typically establishes a link with one or more routers. The routers, in turn, can establish links with servers of other networks or online service providers. It will be appreciated that two or more of the network devices may be combined. For example, a router may be located within the gateway device 30.

Referring now to FIGS. 2 and 3, a description will now be provided of various embodiments and implementations of systems and methods capable of improving web browser redirection.

Figure 2A:
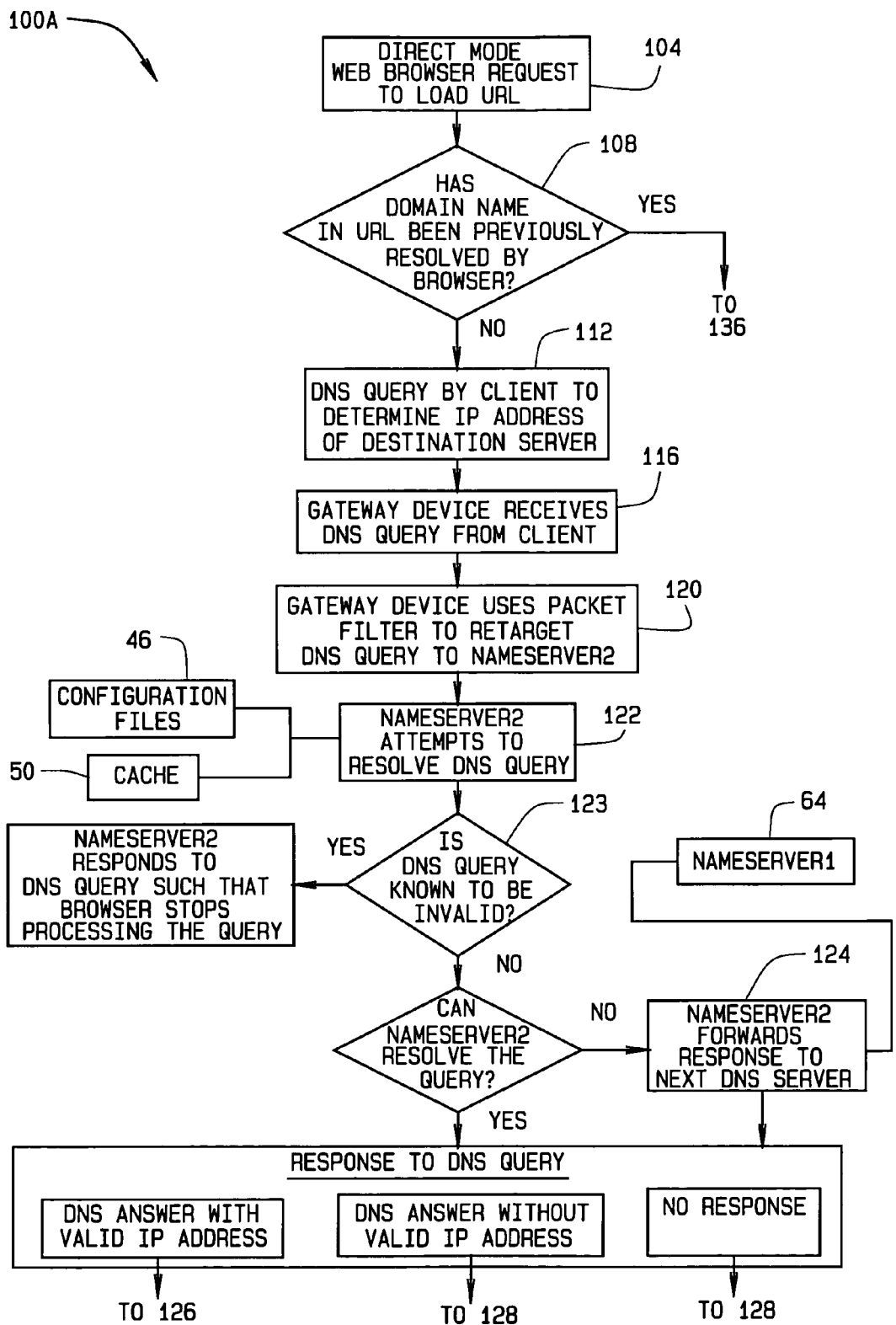
FIGS. 2A through 2C illustrate exemplary operations for redirecting an access request, originating from a direct mode web browser, to load an original destination address according to one implementation of the invention.
Figure 2B:
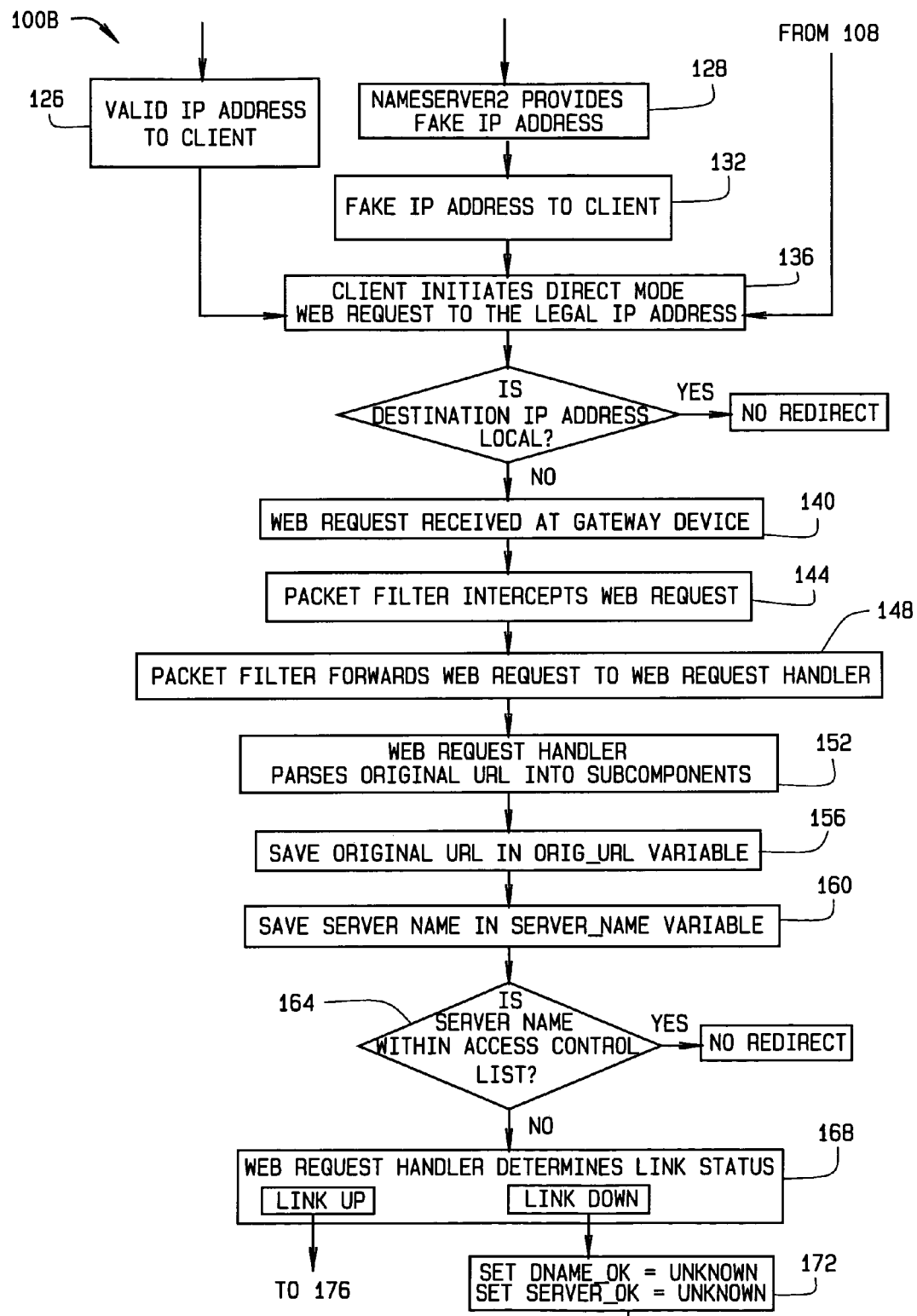
Figure 2C:
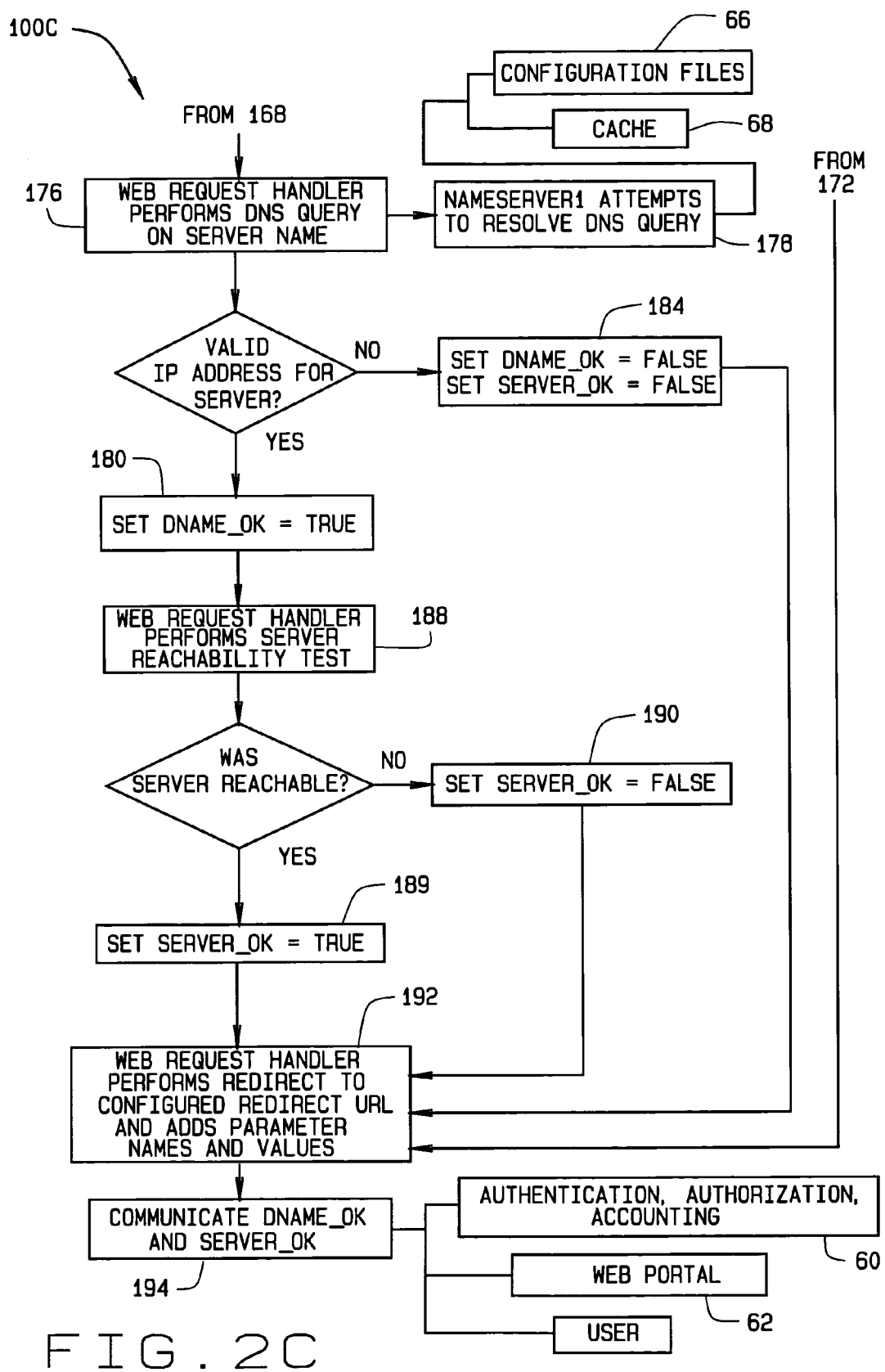

FIGS. 2A through 2C illustrate various operations of an exemplary process 100 for redirecting a HTTP request by a direct mode web browser to load an original destination address, such as a URL or web address. In some implementations, and with reference to proxy discovery as further described below, these operations can occur during a pre-login phase. A logged-in user may be granted wide-open access to the upstream network such that access requests from the logged-in user are not redirected. Alternatively, however, redirection operations can also occur for post-login users. For example, a link-test described below could be performed before forwarding an access request upstream, and a redirect to an error page could be performed if the link is down. In yet other implementations, redirection can occur whether a user is authorized or not and at various other times and phases.

It is assumed in process 100 that web browser proxy-related configuration(s) (whether automatically, manually, or a combination thereof) has already been completed. By way of example, web browser proxy-related configuration can be accomplished by various systems and methods of the present invention described further below.

It is noted that process 100 can be used for web browsers that are in direct mode. Access requests by web browsers in proxy mode can be processed in accordance with process 200 described below and shown in FIGS. 3A through 3B. By way of background, there are two ways in which a web browser can make web requests to access a web server 1) direct mode; and 2) by proxy mode. With direct mode access, the web browser makes web requests directly to servers. In proxy mode, the web browser makes web requests through a proxy server, which performs the request on behalf of the browser, but only if permitted by access control rules implemented by the proxy server.

It is understood that while various implementations are described herein in conjunction with the public Internet, implementations of the invention are also applicable to other networks besides the Internet such as a local area network (LAN), an Intranet, etc.

It is further understood that the various operations shown in FIGS. 2 and 3 can be implemented with computer readable program code on a wide range of computer systems and networks. Such computer readable program code need not be combined in a single package but may instead be embodied in separate components. In addition, the computer readable program code may be a stand-alone application, software package, or may be a plug-in module for an existing application and/or operating system. Alternatively, the computer readable program code may be integrated into an application or operating system. In yet another implementation, the computer readable program code may reside at one or more network devices (not shown), such as an administrator terminal, a server, etc.

As shown in FIG. 2A, operation 104 includes a direct mode web browser 22 attempting to make an HTTP request to load an original destination address, such as a URL or web address.

Operation 108 includes determining whether the domain name in the HTTP request by the client 14 has been previously resolved to an IP address by the browser 22. If so, process 100 proceeds to operation 136 (FIG. 2B). Otherwise, the HTTP request is handled in two separate phases, the first beginning at operation 112, and the second beginning at operation 136.

With further reference to FIG. 2A, operation 112 includes the client 14 performing a Domain Name Service (DNS) query to determine the IP address of the destination server. DNS is a standard IP protocol and service that can be used to translate domain names (e.g., www.yahoo.com, etc.) to IP addresses (e.g. 200.35.53.2, etc.). Because DNS servers can be chained or linked together, resolving a single DNS query may require the cooperation of one or more different DNS servers. The destination server can be any of a wide range of computing devices capable of servicing standard access requests from client computers, such as HTTP requests, DNS queries, web requests, IP requests, etc.

At operation 116, the gateway device 30 receives the DNS query from the client 14.

At operation 120, the gateway device 30 uses Packet Filter 34 to retarget the query packet to Nameserver2 38.

Operation 122 includes Nameserver2 38 trying to resolve the DNS query, for example, by accessing Configuration Files 46 and/or Cache 50. If the DNS query has previously been handled and thus the answer stored in Cache 50, Nameserver2 38 will find the answer to the DNS query within Cache 50. If the previous cached answer has timed-out, Nameserver2 38 will try to resolve the query again.

With reference now to FIGS. 1 and 2A, Nameserver2 38 can also include features that are active during a pre-login phase to reduce redirect delays and block requests that are known to be invalid. These features, further described below, can be implemented with configuration rules that prevent certain DNS queries from being answered. Nameserver2 38 can support configuration files that include pattern matching rules and internal code for situations that cannot be easily described in a simple pattern-matching rule. These configuration files can be loaded into the run-time memory of Nameserver2 38 each time Nameserver2 38 is enabled to compare each DNS query against the list of rules. This feature can be especially beneficial where network bandwidth is limited and/or very costly, as it prevents the upstream network from being used for DNS queries known to be invalid. If a special rule is in effect, Nameserver2 38 may respond to the DNS query at operation 123 in such a way, for example, that a browser stops processing the DNS query, which also results in the browser not performing the web request. This can have the beneficial result of reducing frequency and number of browser redirects that must be processed by the Web Request Handler 42, Authentication, Authorization, Accounting 60, and/or Web Portal 62.

If Nameserver2 38 cannot resolve the query on its own at operation 122, Nameserver2 38 forwards the DNS query at operation 124 to the next DNS server. The next DNS server can reside on the same box as the gateway device 30, such as Nameserver1 64. And the next DNS server after that can be upstream of the gateway device 30. Alternatively, other configurations are possible for the next DNS servers.

Eventually, a response to the DNS query will be obtained, or a link-down condition will be recognized, or a timeout will occur. Timeouts can happen when the link is unreliable or relatively very slow.

When the response contains a DNS Answer with a valid IP address for the destination server, Nameserver2 38 forwards that response to the client 14 at operation 126 (FIG. 2B), and process 100 proceeds to operation 136. A valid IP address is a legal IP address that represents the address of an actual web server. A legal IP address is a well-formed IP address that IP capable software (such as web browsers, etc.) will treat as being acceptable for normal IP protocols. When there is no response (e.g., because the link is down or a timeout occurs, etc.), but there is a previously cached timed-out DNS Answer, Nameserver2 38 will reuse the cached DNS Answer, rather than provide a fake IP address as described below.

When there is no response (e.g., because the link is down or a timeout occurs, etc.) or the response does not contain a valid IP address for the destination server, operation 128 includes Nameserver2 38 providing a fake IP address. As used herein, the term "fake IP address" refers to and includes a legal IP address that does not represent an actual web server. At operation 132, the spoofed DNS response including the fake IP address is returned to the client 14.

Without being provided a fake IP address, browser redirection would stop because the browser is not able to continue processing the web request without a legal IP address. Because Nameserver2 38 can return a fake IP address even during link-down situations when upstream network infrastructure is unavailable, implementations of the invention advantageously support the ability to perform a redirect without the upstream network being in an "up" status. In contrast, existing web browser redirection systems require the upstream network to be "up" and available because in a normal IP network the DNS query chain cannot be satisfied if the upstream network is not up. For these other systems, the customer's browser will "hang" when the DNS query is being performed, and eventually the browser will time-out and display an error message indicating a DNS failure.

This ability to perform a redirect even when the network is down has broad applicability. Although a typical ground-based or terrestrial network configuration would usually be expected to have the network always up and available, the ability to perform a redirect when the upstream network is unavailable, instead of allowing the customer's browser to "hang", means that a user-friendly error page can be displayed indicating network problems. This enables displaying of locally managed web pages, which could support e-commerce, advertising, or other common web activities.

Furthermore, the ability to function with the network down has significant benefits for a mobile network in which the network being down is a normal situation. There may be regularly scheduled periods in which the upstream network may not be accessible. For example, in a mobile airborne, satellite-based network, there may be restrictions on satellite antenna operations at certain altitudes, or when in close proximity to populated areas. Mobile networks can also present challenges for installation and check-out activities. For example, when testing and checking out a system in a configuration in which the upstream network is down, having a redirect implementation which will still function is yet another important benefit realizable with implementations of this invention.

For some browser types and client operating systems and configurations that employ mapped network drives (MND) 26 (FIG. 1), providing fake IP addresses might cause delays (e.g., 50-75 seconds) when a web browser is first used to perform web requests. These delays have been observed to be independent of whether proxy settings are enabled or not. Ideally, a redirect implementation should result in little, if any, delay in responding to the browser's web request and performing the redirect. If not accommodated, redirect delays occurring when MND activity is present can be long enough that some users may become confused about what is happening, perhaps believing it to be an indication of a network problem.

To eliminate, or at least reduce, these delays, an aspect of this invention includes implementation of Mapped Network Drives Handler 58. In some implementations, Mapped Network Drives Handler 58 includes one or more software components designed to transparently spoof the network protocols and services used and expected by the MND client software. Mapped Network Drives Handler 58 can significantly reduce browser startup delay (e.g., to 3-5 second delays) and thus improve the speed at which an initial redirect occurs.

An exemplary operation of Mapped Network Drives Handler 58 will now be provided. After being provided with a fake IP address for a non-resolvable domain name, MND software running on a client can erroneously determine that the network file servers are available, and then attempt to mount network drives. First, a client can send two ICMP (Internet Control Message Protocol) echo requests to determine whether a file server is available. Packet Filter 34 is configured with a rule that causes ICMP reject messages to be returned for ICMP echo requests that use fake IP addresses. These reject messages shorten the time the client would otherwise wait for a reply to the ICMP requests. Next, whether or not the ICMP requests are replied to, the MND client software then attempts to establish a SMB (Server Management Block) protocol connection to the file server at TCP (Transmission Control Protocol) port 445, and sometimes also at port 139.

By using Packet Filter 34 rules, SMB requests are intercepted and redirected to Mapped Network Drives Handler 58. Mapped Network Drives Handler 58 spoofs the SMB client request by responding as though it were a valid SMB server, and returning responses to the client indicating that the requested server is not available. The MND client software may repeat this sequence several times for each mapped network drive before ultimately giving up.

For a situation in which a fake IP address is supplied for a non-public domain name within an original destination address, a user-friendly error page can be displayed upon login as described below. But it is common for multiple web requests and multiple redirects to occur during a pre-login phase before the user logs in. Typically, only the original destination address of the last redirect will be used when a post-login redirect is performed. But each and every different URL that is attempted in the pre-login phase can result in a fake IP address being provided.

As further described below, when a fake IP address is supplied for a public domain name because of network timeouts and/or link-down conditions during the pre-login phase, Web Request Handler 44 may be employed during post-login. Web Request Handler 44 may include Packet Filter 34 rules and a web proxy server, both of which may be configured for use by post-login users. Packet filter 34 rules may cause an HTTP request to a fake IP address to be transparently proxied to the post-login web proxy server of Web Request Handler 44. Such handling of fake IP addresses in a post-login phase may enable web browsers using fake IP addresses to reach the web server associated with the domain name for which the fake IP address was provided. Most web browser implementations are configured to cache IP addresses in their run-time program memory and do not honor DNS TTL (time-to-live) parameters. TTL expiration would ordinarily cause a network application to reissue the domain name lookup. If browsers were to honor TTL parameters, then the fake IP address addresses could use a very short TTL and depend on a browser to replace the fake IP address with a valid IP address at a later time when the network is up. By ensuring that operations occurring during a pre-login phase do not cause problems for the browser or its user in the post-login phase, aspects of this invention are able to provide even more high-quality and robust browser redirect implementations.

With further reference to FIG. 2B, now that the client 14 has obtained a legal IP address for the destination server (whether initially or through operations 112 through 132), operation 136 includes the client 14 initiating the web request to the legal IP address.

If the destination IP address of the web request is the gateway device 30 or other network device on the local network, the web request will not be redirected. Instead, if the destination IP is the gateway device 30, Packet Filter 34 will accept the web request and then forward the web request to the gateway device service that was requested. If the destination IP is another server on the local network that is co-located with the gateway device 30, the local network configuration will forward the web request to the local server, and in at least some cases, without even being seen by the gateway device 30.

But if the destination IP address of the web request is not the gateway device 30 or other local network device, operation 140 includes the web request being forwarded to and received by the gateway device 30. On the gateway device 30, Packet Filter 34 can intercept the request at operation 144 and then forward the request to Web Request Handler 42 at operation 148.

Operation 152 includes Web Request Handler 42 detecting, determining, and parsing the original URL into its sub-components. For example, a URL such as "http://www.yahoo.com/index.html" includes a protocol name "http" (hypertext transfer protocol), a server name "www.yahoo.com", and a path string "index.html".

Operation 156 includes saving the original URL in an "orig_url" variable. Operation 160 includes saving the server name in a "server_name" variable.

At operation 164, a determination is made as to whether the server name matches an entry in Access Control List 54 (FIG. 1). If so, no redirect is performed and depending on the type (e.g., port number used, etc.) of the web request, the request may be immediately forwarded to the upstream network, or the link status may be checked first before causing the request to be forwarded to the upstream network.

At operation 168, Web Request Handler 42 determines whether the link status is up or down. Link status generally refers to the status of the communication link(s) from the gateway device 30 to the upstream network or network devices upstream of the gateway device 30. In existing systems, a gateway device expects the link to be always up or most always up, such as in a terrestrial network environment. But for a gateway device in a mobile network, the link may not always be up as there may be times when the link is up but drops out for short periods. Link status can refer to the satellite or other communication link status and the hardware and software components required to establish a good link to the upstream network, as all other links in the network can generally be assumed to be highly reliable.

Link status can be determined by periodically performing a DNS query using a well-established domain name directly to a known DNS server in the upstream network. If this DNS query can be satisfied, the link is considered up. But if the DNS query cannot be satisfied, the link is considered down. In some implementations, Web Request Handler 42 is designed so that the link status check is not performed every time an access request is made by a browser, but instead is performed periodically at configurable time periods or intervals.

If Web Request Handler 42 determines at operation 168 that the link is up, process 100 proceeds to operation 176 (FIG. 2C). But if Web Request Handler 42 determines that the link is not up, operation 172 includes setting parameters dname_ok=unknown to indicate that it is unknown whether the domain name is resolvable, and setting server_ok=unknown to indicate that it is unknown whether the destination server is reachable.

At operation 176, Web Request Handler 42 performs a DNS query on the server name, for example, by accessing Nameserver2 38 in operation 178. Nameserver2 38 accesses Configuration Files 46 and/or Cache 50. If the DNS query has previously been handled and thus the answer stored in Cache 50, Nameserver2 38 finds the answer to the DNS query within Cache 50 assuming the previously stored answer has not timed-out. If the answer has timed-out, Nameserver2 38 forwards the query to the next DNS server to obtain an up-to-date answer before responding to the query from Web Request Handler 42. It should be noted that Nameserver2 38 is designed to behave differently depending on the context, and/or on the operating mode of a client making the DNS query. Whereas in operation 128 Nameserver2 38 provides a fake IP address to a DNS query from a browser for a non-resolvable domain name, in operation 178 Nameserver2 38 does not provide a fake IP address for non-resolvable domain names, but instead returns a standard DNS reply indicating the domain name is not resolvable.

If this DNS query results in obtaining a valid IP address, operation 180 includes setting dname_ok=true to indicate that the domain name is resolvable. Otherwise, operation 184 includes setting dname_ok=false to indicate that the domain name is not resolvable, and setting server_ok=false to indicate that the destination server is not reachable.

In some implementations, the DNS query for the server name (operation 176) and the test for link status (operation 168) are preferably not performed simultaneously. The DNS query for the server name preferably does not go directly to the upstream DNS server, but instead is first processed by the gateway device's Nameserver2 38 DNS software. This allows the gateway device 30 to try and to resolve the DNS query for the server name. In addition, Web Request Handler 42 and other components may benefit from the caching behavior of Nameserver2 38 DNS software on the gateway device 30. Further, the link test software or program code can contact the upstream DNS server directly, and the link test is preferably only performed periodically.

Operation 188 includes Web Request Handler 42 performing a server reachability test on the destination IP address. If the server is reachable, operation 189 includes setting server_ok=true to indicate that the server is reachable. But if the server is not reachable, operation 190 includes setting server_ok=false to indicate that the server is not reachable.

At operation 192, Web Request Handler 42 performs the redirect to the configured redirect URL, and adds parameter names and values. For example, a redirect of the web request for www.yahoo.com can result in a modified URL that contains parameters that look like:

orig_url=http://
www.yahoo.com&dname_ok=true&server_ok=true

Parameters dname_ok and server_ok and their values can be used in various ways. For example, parameters dname_ok and server_ok can optionally be communicated at operation 194 to Authentication, Authorization, Accounting component 60, to Web Portal 62, and/or to a user. The server(s) handling the modified redirect URL can optionally use parameters dname_ok and server_ok to avoid the normal post-login redirect to the original URL when parameter dname_ok=false (indicating that the domain name is not resolvable) and/or parameter server_ok=false (indicating that the destination server is not reachable). Rather than allowing the browser to "hang" and eventually time-out and display an error message, the client can instead be directed to a second redirected destination address, such as a user-friendly error page, when parameter dname_ok=false and/or parameter server_ok=false. Similar actions can be taken when dname_ok=unknown and/or server_ok=unknown. Additionally, or alternatively, parameters dname_ok and server_ok can optionally be displayed in the address bar of the client web browser, thereby providing the user a self-service method of determining whether their desired web server is available or not.

Regardless of how parameters dname_ok and server_Ok are ultimately used, operations 104 through 194 can be repeated for further access requests to an original destination address made by a direct mode browser.

In FIGS. 2A through 2C, various operations of process 100 may occur before redirecting the client to a redirected destination address. Alternatively, the domain name validity and server reachability tests can be performed at various other times, such as while the client is being redirected, after the client has been redirected to a redirected destination address (e.g., a portal page or login page), before the client is redirected to the original destination address, after the client is redirected to the original destination address, etc. Preferably, the domain name validity tests and server reachability tests are performed before the client is redirected to the original destination address so as to enable the user-friendly behavior described above. In alternative implementations, the domain name validity and server reachability tests could be performed by Authentication, Authorization, Accounting component 60 and/or Web Portal 62.

Figure 3A:
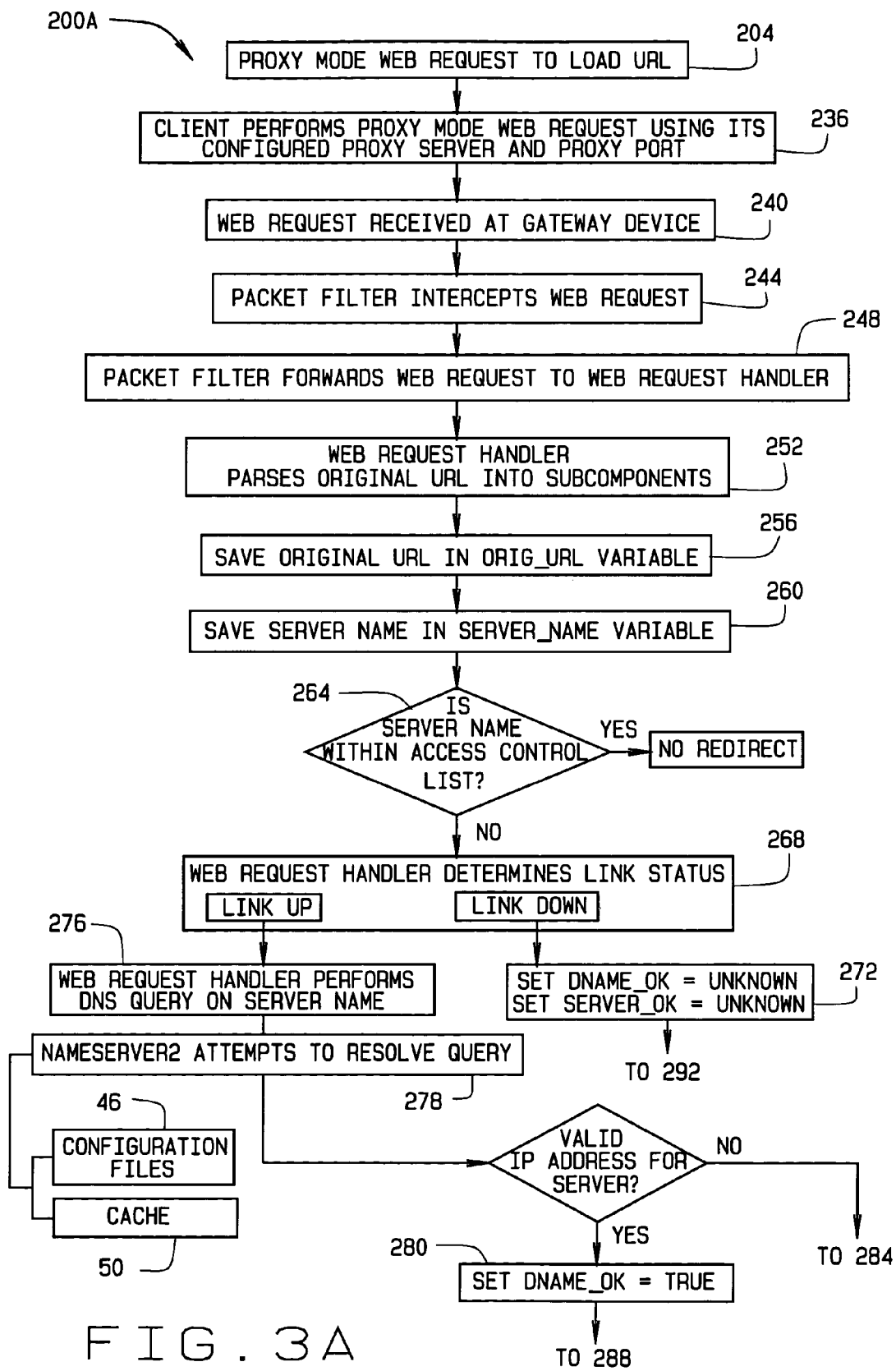
FIGS. 3A through 3B illustrate exemplary operations for redirecting an access request, originating from a proxy mode web browser, to load an original destination address according to one implementation of the invention.
Figure 3B:
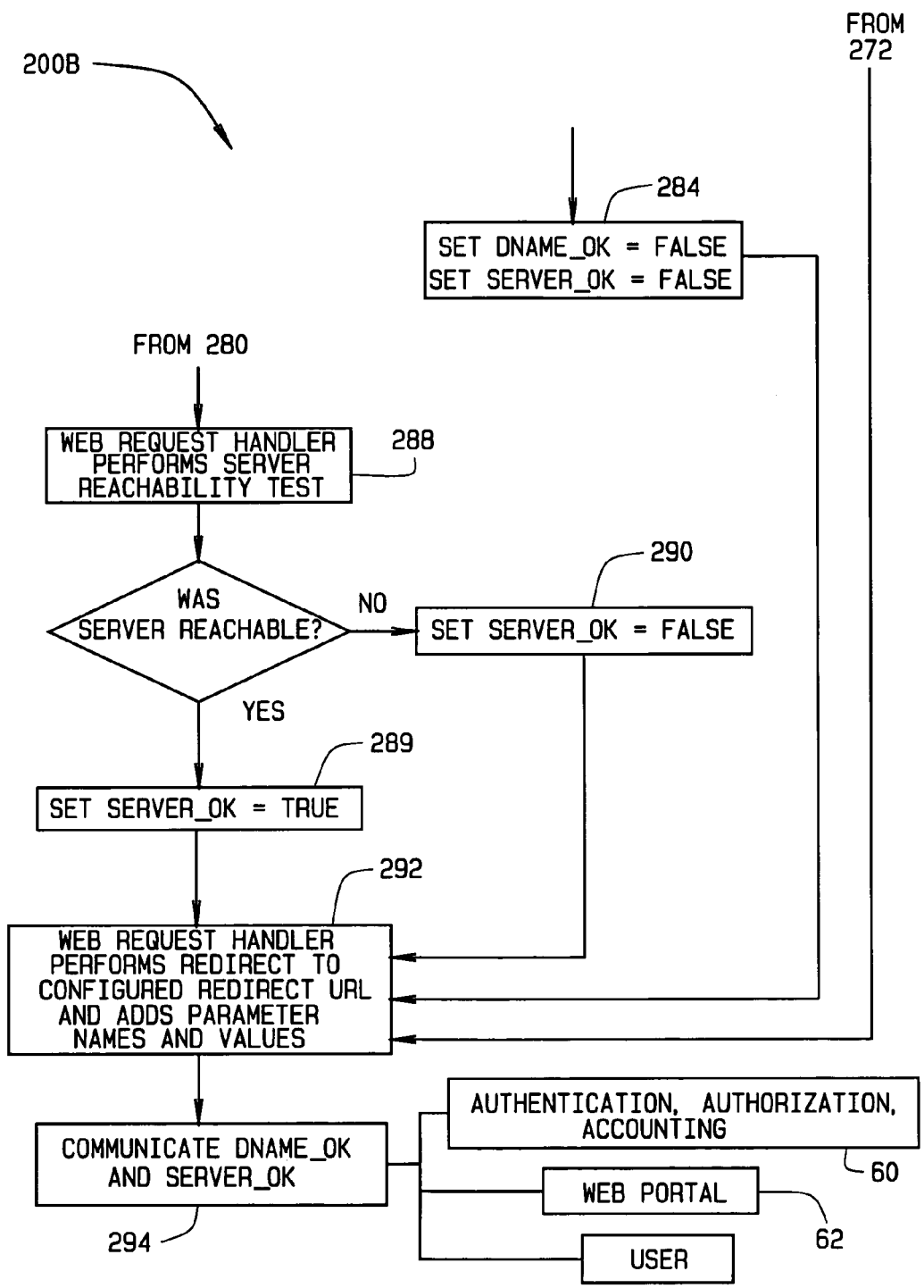

FIGS. 3A through 3B illustrate various operations of an exemplary process 200 for redirecting an HTTP request by a proxy mode web browser to load a URL or web address. In some implementations and also in connection with proxy discovery as further described below, these operations can occur during a pre-login phase. A logged-in user may be granted wide-open access to the upstream network such that access requests from the logged-in user are not redirected. Alternatively, however, redirection operations can also occur for post-login users. For example, a link-test described below could be performed before forwarding an access request upstream, and a redirect to an error page could be performed if the link is down. In yet other implementations, redirection can occur whether a user is authorized or not and at various other times and phases.

For process 200, it is assumed that web browser proxy-related configuration(s) (whether automatically, manually, or a combination thereof) has already been completed. It is further assumed that the web browser 22 has been enabled to make proxy mode requests. By way of example, web browser proxy-related configuration can be accomplished by systems and methods described further below.

As shown in FIG. 3A, operation 204 includes a proxy mode web browser 22 attempting to make a web request to load a URL. Generally, a proxy mode browser does not try to resolve the domain names in the URLs it loads. Instead, the proxy mode browser forwards the entire URL to a proxy server. The proxy server performs the DNS query on behalf of the client. Then, the proxy server performs the web request for the client, returning the response to the client. From the client's perspective, each web request appears to be handled in one step, i.e., a single request to the proxy server. Nameserver2 38 may be used by Web Request Handler 42 to satisfy domain name queries.

With further reference to FIG. 3A, operation 236 includes the client 14 performing a proxy mode web request by using its configured proxy server and proxy port.

At operation 240, the proxy mode web request is forwarded to and received by the gateway device 30. On the gateway device 30, Packet Filter 34 can intercept the request at operation 244 and then forward that request to Web Request Handler 42 at operation 248.

Operation 252 includes Web Request Handler 42 detecting, determining, and parsing the original URL into its sub-components. For example, a URL such as "http://www.yahoo.com/index.html" includes a protocol name "http" (hypertext transfer protocol), a server name "www.yahoo.com", and a path string "index.html".

Operation 256 includes saving the original URL in an "orig_url" variable. Operation 260 includes saving the server name in a "server_name" variable.

At operation 264, a determination is made as to whether the server name matches an entry in Access Control List 54 (FIG. 1). If so, no redirect is performed and depending on the type (e.g., port number used, etc.) of the web request, the request may be immediately forwarded to the upstream network, or the link status may be checked first before causing the request to be forwarded to the upstream network.

Operation 268 includes Web Request Handler 42 determining whether the link status is up or down.

If Web Request Handler 42 determines at operation 268 that the link is up, process 200 proceeds to operation 276. But if Web Request Handler 42 determines that the link is not up, operation 272 includes setting parameters dname_ok=unknown to indicate that it is unknown whether the domain name is resolvable, and setting server_ok=unknown to indicate that it is unknown whether the destination server is reachable.

At operation 276, Web Request Handler 42 performs a DNS query on the server name. At operation 278, Nameserver2 38 attempts to resolve the query. As described above with reference to operation 178, Nameserver2 38 does not provide a fake IP address for a non-resolvable domain name when used in this context, but instead responds with a standard DNS reply used for describing a non-resolvable domain name. If this DNS query results in obtaining a valid IP address, operation 280 includes setting dname_ok=true to indicate that the domain name is resolvable. Otherwise, operation 284 includes setting dname_ok=false to indicate that the domain name is not resolvable, and setting server_ok=false to indicate that the destination server is not reachable.

Operation 288 includes Web Request Handler 42 performing a server reachability test on the destination IP address. If the server is reachable, operation 289 includes setting server_ok=true to indicate that the server is reachable. But if the server is not reachable, operation 290 includes setting server_ok=false to indicate that the server is not reachable.

At operation 292, Web Request Handler 42 performs the redirect to the configured redirect URL, and adds parameter names and values. For example, a redirect of the web request for www.yahoo.com can result in a modified URL that contains parameters that look like:

orig_url=http://www.yahoo.com&dname_ok=true&server_ok=true

Parameters dname_ok and server_ok and their values can be used in various ways. For example, parameters dname_Ok and server_ok can optionally be communicated at operation 294 to Authentication, Authorization, Accounting component 60, to Web Portal 62, and/or to a user. The server(s) handling the modified redirect URL can optionally use parameters dname_ok and server_ok to avoid the normal post-login redirect to the original URL when parameter dname_ok=false (indicating that the domain name is not resolvable) and/or parameter server_ok=false (indicating that the destination server is not reachable). Rather than allowing the browser to "hang" and eventually time-out and display an error message, the client can instead be directed to a second redirected destination address, such as a user-friendly error page, when parameter dname_ok=false and/or parameter server_ok=false. Similar actions can be taken when dname_ok=unknown and/or server_ok=unknown. Additionally, or alternatively, parameters dname_ok and server_Ok can optionally be displayed in the address bar of the client web browser, thereby providing the user a self-service method of determining whether their desired web server is available or not.

Regardless of how parameters dname_ok and server_ok are ultimately used, operations 204 through 294 can be repeated for further access requests to an original destination address made by a proxy mode browser.

In FIGS. 3A through 3B, various operations of process 200 can occur before redirecting the client to the redirected destination address. Alternatively, the domain name validity and server reachability tests can be performed at various other times, such as while the client is being redirected, after the client has been redirected to the redirected destination address (e.g., a portal page or login page), before the client is redirected to the original destination address, after the client is redirected to the original destination address, etc. Preferably, the domain name validity tests and server reachability tests are performed before the client is redirected to the original destination address so as to enable the user-friendly behavior described above. In alternative implementations, the domain name validity and server reachability tests could be performed by Authentication, Authorization, Accounting component 60 and/or Web Portal 62.

Accordingly, various implementations of the invention enable and support redirection of access requests to destination addresses (e.g., URLs, etc.) having non-resolvable domain names, such as nonpublic domain names. Additionally, various implementations support redirect for destination addresses even if network infrastructure is unavailable. This ability to perform a redirect even while upstream network infrastructure is unavailable makes various implementations of the invention particularly suitable for mobile networks (e.g., network on a mobile platform) in which the service to the upstream network is sometimes unavailable or intermittently down. It also improves testability for installation and check-out activities. For example, tests related to redirect and accessing on-board portal content can be performed in an installation and check-out setting while the satellite communication subsystems are turned off (e.g., when an aircraft is on the ground, etc.).

Various implementations can also provide means for communicating to other subsystems the validity of domain names and reachability of servers. Various implementations can further provide other benefits such as enhanced ease-of-use for users, lower rate of problems while using a mobile network, and lower rate of trouble reports to the customer care department.

Transparent Handling of Browser Proxy Configurations

Various implementations of proxy discovery and support of proxy-mode configurations shall now be described. The terms "proxy discovery" and "proxy discovery process" are used to refer to a process, driven by a browser, that includes performance of proxy configuration by the browser and response(s) thereto by a gateway device through which the browser attempts to reach an upstream network. Various implementations of the invention may intercept and recognize web requests from clients 14, distinguish the types of requests, and store details, for example, as to the type and source of a request. In some configurations of the present invention, proxy-mode web requests made by a plurality of browsers 22 via the gateway device 30 may be transparently handled. The browsers may reside on a single client 14, may have different proxy configurations, and/or may make more than one type of web request, e.g., combinations of direct-mode and proxy-mode requests.

Various configurations of the present systems and methods can recognize and handle a plurality of different proxy configurations for various different user software components. As will be appreciated, users can be anticipated to be using a variety of different clients from a variety of different manufacturers, each potentially having different proxy configurations, each running different browsers, as well as different versions of similar browsers. Some implementations of the present invention can handle proxy URL requests in accordance with a plurality of different proxy configuration protocols to ensure that a wide range of software components are able to access and use an upstream network via the gateway device 30.

Pre-Login Phase

A user of the system 10 connects his/her client 14 to the inside network of the gateway device 30, e.g., via a wired or wireless connection point. At this time, web browser software and the non-logged-in user's client 14 may start making web requests. Software for a given browser 22 may not have been running on the user's client 14, and may have just been started, or the web browser software could have been running but, upon recognizing that a network connection has just been established, performs a reconfiguration operation. Other web request software may also be running and be in various states (starting, running, re-configuring) on the same client 14.

It generally is desirable for a proxy-handling system to be able to detect browser behavior when browser software starts up, since proxy configuration activities typically occur early after the browser is started. For some browser types or versions, proxy configuration activity occurs just prior to a browser's attempt to load a first external URL. It will also be appreciated that a web browser can be configured to start with a blank page or a local web page. Thus the first external URL load may not be attempted until the user enters a URL from the browser or clicks on a button or favorite link displayed on a browser screen. Specific proxy handling procedures depend on what a given browser's proxy configuration is and how that particular type of browser behaves. In some cases, the user is able to use a browser 22 immediately, and in other cases a browser may not immediately function and needs to be exited and restarted. Just after startup, or just prior to loading the first URL, a browser attempts to configure its proxy settings. Depending on the browser, an implementation of the discovery process described herein could result in one or more DNS queries, and one or more requests for proxy configuration files, either stored locally on the same computer as the browser, or on another network device.

It has been demonstrated that a proxy discovery process can be accelerated when network services are implemented which are specifically designed to respond to various types of requests made during the proxy discovery process. Shortening the total time for a proxy discovery process can be beneficial and desirable to a client user. Various features, including but not limited to the MNDH (mapped network drive handling) capability described herein, may be implemented to shorten the time it takes to complete proxy discovery and/or the time it takes to perform a browser redirect as described herein.

With respect to handling proxy configuration file requests, responding to such requests in accordance with various implementations of the invention is generally useful in reducing the time for the proxy discovery process. Nevertheless, depending on the particular behavioral aspects of a given browser, in some implementations the handling of some proxy configuration file requests may be completely disabled or completely enabled, and/or may warrant other appropriate action by the system 10.

A browser 22 typically is in direct mode when it begins proxy auto-configuration. In some implementations, at the end of proxy configuration, the browser may remain in direct-mode or may switch to proxy-mode depending upon proxy configuration settings, and further depending, for example, on proxy configuration files that may be requested by and returned to the browser. In various implementations of the invention, web browsers are able to use a network without a user having to make any manual proxy configuration changes in his/her browser 22. The foregoing capability is implemented dependent on what proxy configuration techniques the browser is capable of. For example, InternetExplorer® has different capabilities from those in Netscape®. Implementing proxy configuration changes for a user's browser also can depend on what the browser is currently configured for. For example, some browsers will not have any proxy configuration settings turned on, while others may have one or more of a plurality of (typically up to three) possible proxy related settings enabled. It should be noted generally that the present invention is not limited to implementation in connection with widely known browsers and/or proxy settings. Implementations also are contemplated with respect to other and/or future browsers and/or proxy setting arrangements.

Where, for example, a browser is capable of and enabled for using Web Proxy Automatic Discovery (WPAD), some implementations of the invention provide functionality for responding appropriately to a WPAD request by the browser, and in such a way that the browser stays in direct mode. Such functionality may be applicable for InternetExplorer® version 5 and higher, on non-Macintosh® operating system platforms. In InternetExplorer®, the WPAD proxy setting may be labeled "automatically detect settings". A domain-name used in a WPAD request is likely not to be configured in Nameserver1 64 of the gateway device 30 or other name servers upstream from the gateway device, and may take different forms depending on a user's network configuration. Accordingly, DNS capabilities of Nameserver2 38 are used to provide an appropriate response to the DNS query, which is made by the browser prior to requesting a proxy configuration file.

More specifically, in WPAD the browser typically makes a DNS query for a domain name beginning with "wpad". In some implementations of the invention, Nameserver2 38 can pattern-match and recognize particular types of DNS queries, including but not necessarily limited to a query for a domain name beginning with "wpad". Nameserver2 38 returns a fake IP address reserved for proxy configuration requests (for example, from a range of fake IP addresses reserved for administrative purposes.) When the browser 222 attempts to load the URL http://wpad.xxx./wpad.dat (where the "xxx" part of the domain name is implementation-dependent), the browser is redirected (as further described herein) to the WRH 42. The WRH 42 checks the full URL and determines that it is a WPAD request. The WRH 42 also recognizes the URL file name "wpad.dat" and thereby determines that the request is a proxy configuration request. If WRH 42 can deduce that the URL being requested is a proxy configuration request, it redirects the browser to a proxy configuration request handler (PCRH) component of WRH 42. PCRH is a software component designed to respond to proxy configuration file requests. Redirection thus ends, for example, before reaching operation 164 (shown in FIG. 2B).

Known network gateway device products typically do not support this feature but rely instead on the fact that if there is no response to the WPAD DNS query or request, the browser typically continues to stay in direct-mode (after a time delay of typically 10-15 seconds), although it also considers this a proxy configuration error. The present system and method provides an important advantage in recognizing a WPAD DNS query from the user's browser. If configurations of the system and method described herein did not recognize such a request, the user's browser would continue through the proxy discovery process. If any other settings were enabled in the user's browser, InternetExplorer® would try to satisfy those settings and would try each setting until successful. Not responding to the browser request would essentially cause the user's browser to temporarily hang until a timeout occurs or a response is received. It is therefore highly advantageous to guide an InternetExplorer® browser into direct-mode via the WPAD feature, rather than to allow the browser to try other proxy configuration settings, including possibly dropping into an enabled fixed-proxy setting. Avoiding time delays that would otherwise be incurred if the WPAD request were not recognized helps to assure a user that his/her network connection is operating properly.

As another example, where a browser is capable of and enabled for using a proxy auto configuration procedure known as "Proxy-Autoconfig-URL", some implementations of the invention provide functionality for responding appropriately to a proxy configuration URL request by the browser, and in such a way that the browser stays in direct mode. Proxy-Autoconfig-URL is supported by most browsers, including Netscape® version 4.X and higher and InternetExplorer® version 4.X and higher.

URLs matching the following patterns can be handled: http://*.pac; http://*proxy* (some implementations may treat the URL as a proxy configuration only if it is the first URL seen from this user). With these URL patterns, "*" matches zero or more characters of any legal form. Other patterns and/or methods for recognizing whether a request is a proxy configuration request also are contemplated. The domain name used in the Proxy-Autoconfig-URL is usually non-public and resolvable only within a company's private network. Thus DNS features in Nameserver2 software, and web request redirection and servicing features in WRH software, are used to respond appropriately. In particular, Nameserver2 38 provides a fake-IP address in response to the DNS query. If WRH 42 can deduce that a URL being requested is a proxy configuration request, it redirects the browser to the proxy configuration request handler (PCRH) component of WRH 42. Redirection thus ends, for example, before reaching operation 164 (shown in FIG. 2B). Further, the fake-IP address returned for the domain name listed in the Proxy-Autoconfig-URL is saved by WRH 42 and then provided to the client by Namserver2 38 should that domain name be re-requested. If the browser is exited and restarted, the Proxy-Autoconfig-URL will be re-requested.

Known systems for handling proxy mode configuration URLs typically do not support this feature. Such systems typically rely on the fact that if there is no response to the Proxy-Autoconfig-URL request, then the browser will stay in direct-mode (sometimes after a time delay of about 5-20 seconds). However, InternetExplorer® will also consider this a proxy configuration error and continue through the proxy discovery process.

It can be advantageous to provide support for recognizing a Proxy-Autoconfig-URL request, for example, to prevent an InternetExplorer® browser type from continuing through a proxy discovery process. If any other settings are enabled, InternetExplorer® tries to satisfy those settings and tries each one until successful. It can be advantageous to guide an InternetExplorer® browser into direct-mode via the Proxy-Autoconfig-URL rather than allow the browser to drop into an enabled fixed-proxy setting. Avoiding a time delay while the InternetExplorer® browser continues to try other settings is useful and beneficial. Otherwise, excessive time delays could cause a user to think a system is not functioning properly while one or more browsers running on the user's laptop is/are simply trying to execute steps to establish a proxy mode configuration.

If a browser reaches a state wherein it uses proxy mode requests to load a URL, it can be described as a proxy mode browser. A single proxy mode configuration for a single browser is, in its simplest form, one of two types: (a) an explicit IP address and port number, or (b) a domain name and port number. Various implementations of the invention can support a browser proxy configuration which has one or more such proxy mode configurations, or multiple browsers with proxy configurations. Proxy mode configurations observed and detected by the WRH 42 software on the gateway device 30 during a pre-login phase can be supported during a post-login phase.

Figure 4A:
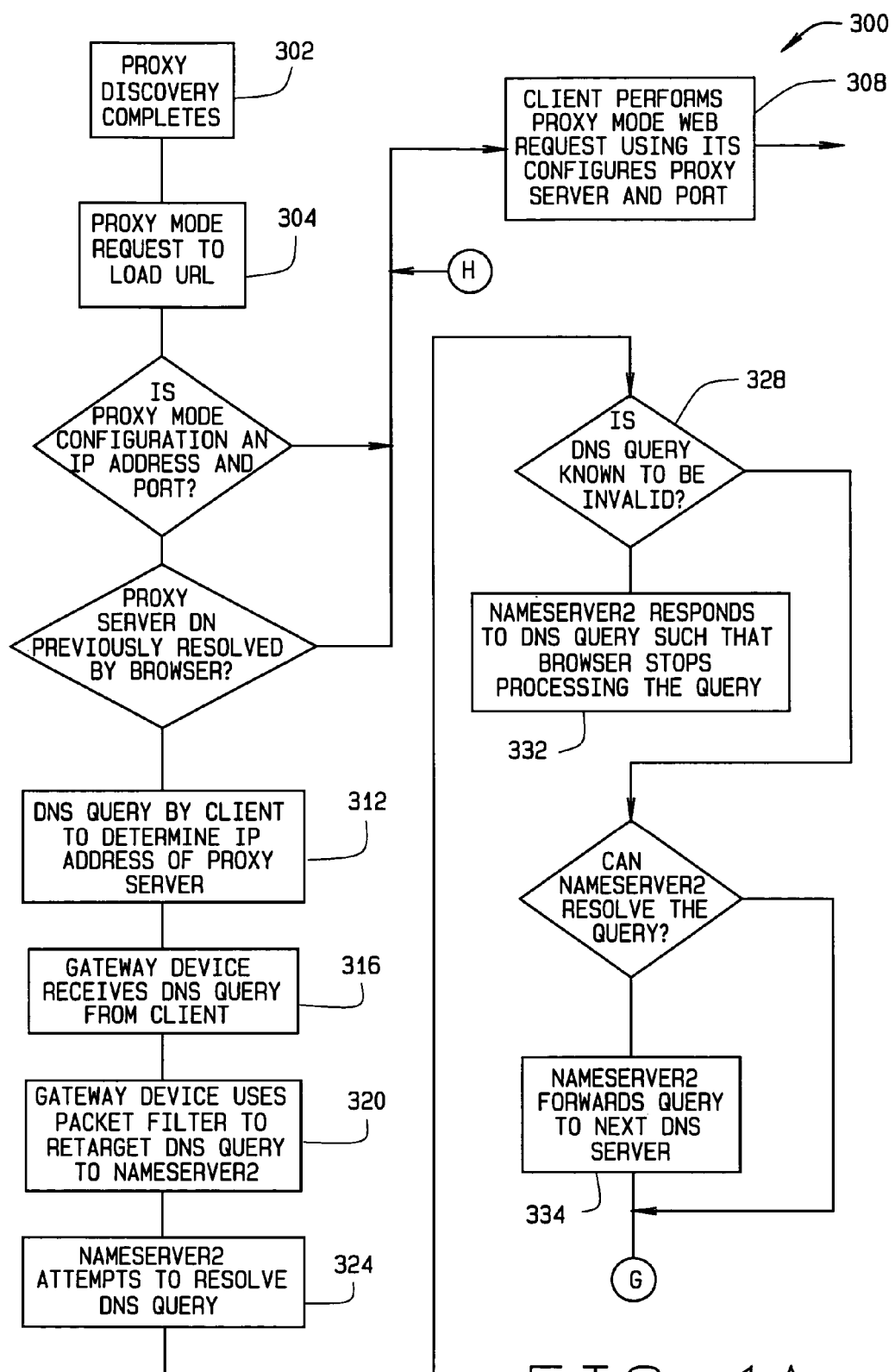
FIGS. 4A through 4B illustrate exemplary operations for browser proxy mode web request handling according to one implementation of the invention.
Figure 4B:
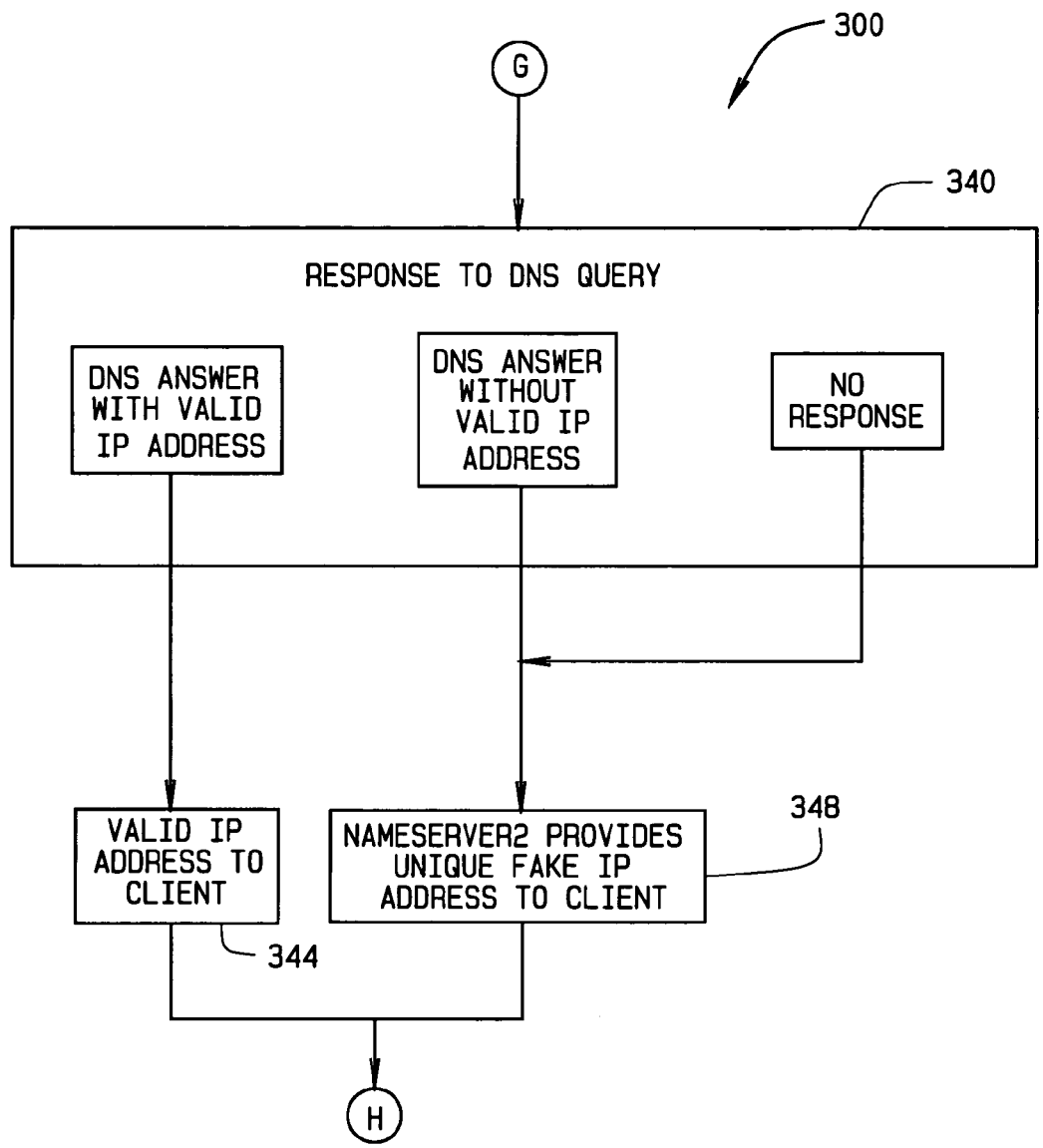

Exemplary operations in a method of browser proxy mode web request handling in accordance with one implementation of the invention are indicated generally in FIGS. 4A and 4B by reference number 300. The method 300 may be used, for example, to resolve a fixed proxy server. Proxy discovery is completed in operation 302 and a proxy-mode request to load a URL is received in operation 304. If the browser has a proxy mode configuration in the form of an IP address and a port, then in operation 308 the client 14 performs the proxy-mode web request using its configured proxy server and proxy port. If the browser has a proxy mode configuration including a proxy server with a previously resolved domain name, then in operation 308 the client 14 performs the proxy-mode web request using its configured proxy server and proxy port. Processing subsequent to operation 308 takes place in the same or similar manner as described with reference to FIG. 3A, operation 240 et seq.

Otherwise, in operation 312 the client 14 makes a DNS query to determine the IP address of a proxy server. In operation 316 the gateway device 30 receives the DNS query from the client 14. In operation 320, the gateway device 30 uses packet filtering to retarget the DNS query to Nameserver2 38. In operation 324, Nameserver2 38 attempts to resolve the DNS query. If in operation 328 the DNS query is known to be invalid, as may be determined by a rule configured in Nameserver2 38, then in operation 332 Nameserver2 38 responds to the DNS query such that the browser stops processing the query. Such a rule is typically not applied for known proxy server domain names, but Nameserver2 38 can provide this capability should it be required. In some implementations, Nameserver2 38 may be configured with one or more pattern matching rules designed to quickly resolve well-known but non-public proxy server domain name queries. If Nameserver2 38 can apply one of these rules, it can resolve such queries internally, thereby avoiding delay that could be caused by trying to resolve a non-resolvable domain name, and thus reducing a total time for performing a redirect. If Nameserver2 cannot resolve the DNS query, in operation 334 it forwards the query to the next DNS server.

In operation 340, a response (if any) to the DNS query is handled. If a DNS answer with a valid IP address is received, then in operation 344 the valid IP address is sent to the client 14. If a DNS answer without a valid IP address is received, or if no response is received, then in operation 348 Nameserver2 38 provides a unique fake IP address to the client. Subsequently, in operation 308, the client 14 performs the proxy-mode web request using its configured proxy server and proxy port. Subsequent processing takes place in the same or similar manner as described with reference to FIG. 3A, operation 240 et seq.

A proxy mode configuration usually involves a single proxy-server and single proxy port. However, multiple proxy-servers and multiple proxy-ports can be used. Each proxy-server may be referred to by a domain-name or an explicit IP address. A proxy-server domain name will usually be a non-public domain name that is resolvable only within a company's private network. Accordingly, DNS features of Nameserver2 38 can be used to provide unique, fake-IP addresses for each non-public domain name. In such manner, an appropriate response can be made to a DNS query that the browser makes to resolve the proxy-server domain name. In order to support multiple client web browsers which may have more than one proxy-mode configuration, each fake-IP address is unique with respect to any other domain-name/fake/IP combinations that have been previously configured and saved for a specific user client 14. It should be noted, however, that although unique fake-IP addresses are provided to a client in the present implementation of proxy mode support, implementations of the present invention, including but not limited to browser redirection as previously described, also are contemplated in which non-unique fake IP addresses may be used in relation to a client. Original proxy server IP address and port numbers may be lost by use of Packet Filter 34 during redirect. Accordingly, WRH 42 also is used to determine the proxy server IP address and proxy port number the browser is configured for by searching PF 34 log files described earlier with reference to WRH 42.

Known gateway device implementations have only limited capability to support proxy-mode browser configurations. Some known implementations assume that there will be only one client software component that makes web requests, so as soon as a direct-mode web request is seen, a proxy-mode browser detection feature is turned off. This results in a failure to support common computer configurations which have multiple components that make web requests, some of which may be in direct mode and others of which may be in proxy mode. Further, the known gateway device implementations only support the first proxy-mode configuration that is found. If multiple proxy-mode configurations are required by a client in known gateway devices, they cannot all be supported.

Generally, WRH 42 handles most web requests during a pre-login phase. When handling a web request, WRH 42 determines whether the request is being made in direct-mode or proxy mode. In one implementation, if the request is being made in direct mode, WRH 42 does not take any extra steps at this point. If the request is being made in proxy-mode, WRH 42 determines the original IP address and port number used for the request. These values are saved in a client-specific data collection area. Each client software component that makes web requests goes through a redirect procedure. If there are multiple client components and more than one proxy-mode configuration in use, WRH 42 is capable of recognizing and determining the different proxy-mode configurations, as long as the software components make at least one request during the pre-login phase.

Figure 5A:
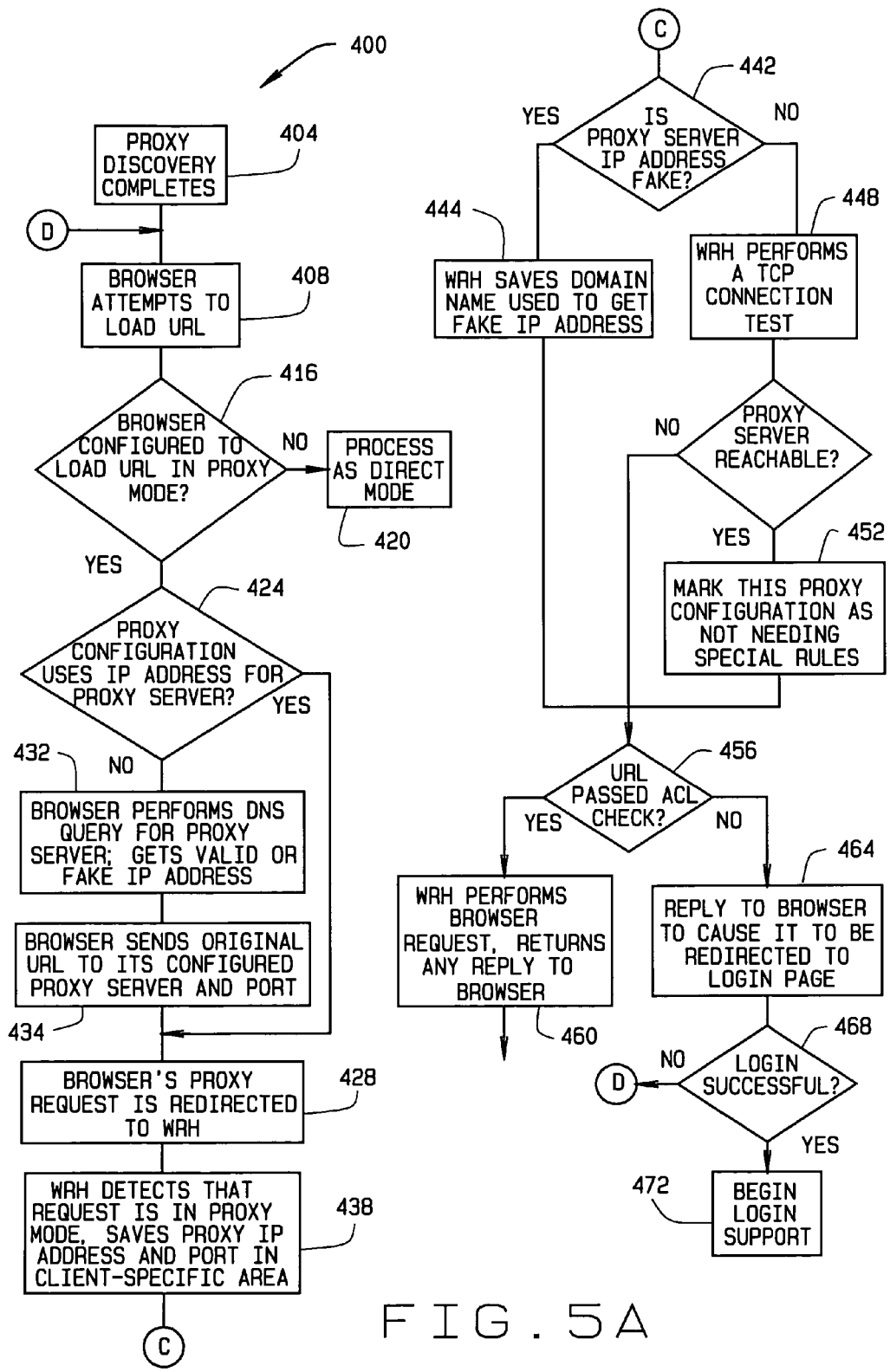
FIG. 5A illustrates exemplary operations included in a method of pre-login detection and handling of a proxy mode configuration in accordance with one implementation of the invention.

Exemplary operations in one implementation of a method of pre-login detection and handling of a proxy mode configuration are indicated generally in FIG. 5A by reference number 400. It should be noted that various operations included in the method 400 can be performed within or around operations described with reference to FIG. 3A, for example, operations 236 and 252. In operation 404, proxy discovery completes. In operation 408 the browser attempts to load a URL. In operation 416 it is determined whether the browser is configured to load the URL in proxy mode. If not, the URL is processed in operation 420 as being in direct mode. If the browser is configured in proxy mode, then in operation 424 it is determined whether the proxy configuration uses an IP address for a proxy server. If yes, then operation 428 is next performed. Otherwise, in operation 432, the browser performs a DNS query for a proxy server and receives either a valid IP address or a unique fake IP address dependent on whether the domain name is publicly available and whether the upstream network is available. It should be noted that the uniqueness of the fake IP address is with respect to the present user and not necessarily across all users. Nameserver2 38 supplies the unique fake IP address and also provides the ability to later determine the domain name used to obtain this particular fake IP address.

In operation 434 the browser initiates a proxy mode request for the URL (from operation 408) by initiating a TCP connection to the proxy server and port and sending the URL to the proxy server IP address at the configured proxy port. In operation 428 the request is redirected to WRH 42, for example, in accordance with operations previously described with reference to FIGS. 3A and 3B. In some cases, redirection may allow the request to go through the gateway device 30 to access services that may be made freely available through use of the ACL 54.

In operation WRH 42 detects that the request has been made in proxy mode. WRH 42 determines the original destination IP address and port number of the request, which is the client's proxy server IP address and port. The proxy server IP address and port are saved in a client-specific data collection area, where they may join other previously saved proxy server and port combinations. If this configuration has been seen previously, the software avoids saving a duplicate.

In operation 442, WRH 42 checks whether the proxy server IP address is a fake IP address. If it is, then in operation 444 the domain name the browser used to obtain the fake IP address is determined and saved. The ability to do this occurs in close cooperation with Nameserver2. If the IP address is not determined to be fake, WRH 42 determines in operation 448 whether the proxy server and port are reachable on the public Internet, by performing a TCP connection test. If reachable, this particular proxy mode configuration is marked as such, and no special packet filter rules are required for this configuration.

In operation 456 the URL requested is checked against the ACL. If the URL passes the ACL check, in operation 460 WRH 42 performs the request on behalf of the browser, returning any reply back to the browser. If the URL is determined to be restricted, in operation 464 a reply is sent to the browser causing it to be redirected to a pre-designated redirection URL, e.g., a splash or login page. If in operation 468 the user decides to login and is successful, then login support may begin in operation 472. If login is not successful, the user may be returned to operation 408.

The above operations may (and usually do) occur repeatedly, by one or more software applications acting as web browsers. By using unique fake IP addresses, and by saving multiple instances of detected proxy mode configurations, support for one or more browsers with one or more proxy configurations can be achieved. Operations 416 through 464 can support both redirection and access-controlled pre-login free access for proxy mode browsers. Pre-login free access can be highly desirable in some configurations, and the user may never feel the need to login. In some configurations, automatic login is provided, whereby instead of a redirect occurring, the WRH 42 software automatically performs a login procedure further described below. Various implementations of automatic login also may support proxy mode configurations.

Figure 5B:
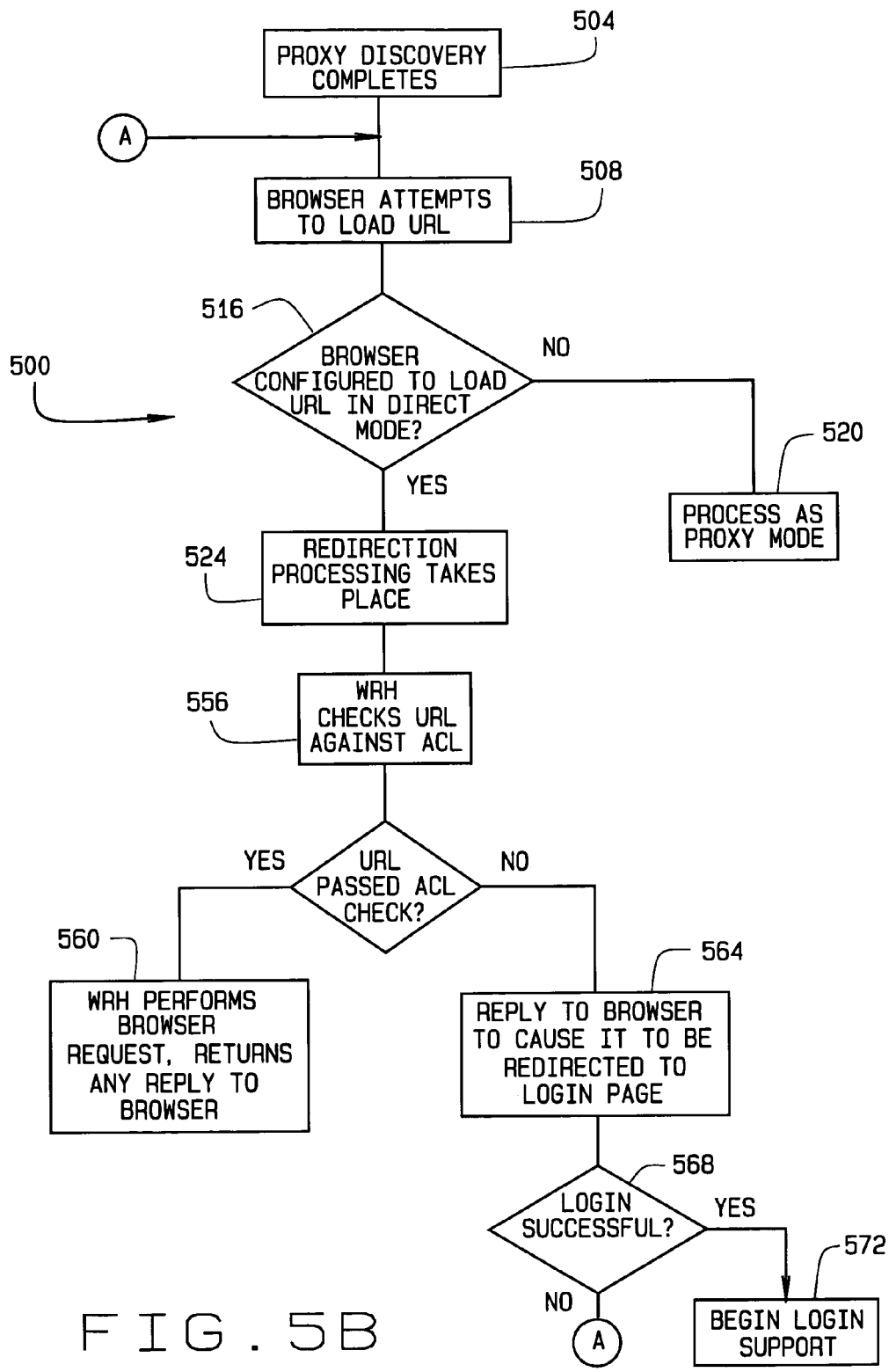
FIG. 5B illustrates exemplary operations included in one implementation of a method of pre-login detection and handling of a direct mode configuration.

Exemplary operations in one implementation of a method of pre-login detection and handling of a direct mode configuration are indicated generally in FIG. 5B by reference number 500. In operation 504, proxy discovery completes. In operation 508 the browser attempts to load a URL. In operation 516 it is determined whether the browser is configured to load the URL in direct mode. If not, the URL is processed in operation 520 as being in proxy mode, e.g., in a manner similar or the same as previously described with reference to FIG. 5A. If the browser is configured in direct mode, then in operation 524 redirection processing is performed, for example, as previously described with reference to FIGS. 2A-2C.

In operation 556 the URL requested is checked against the ACL 54. If the URL passes the ACL check, in operation 560 WRH 42 performs the request on behalf of the browser, returning any reply back to the browser. (Thus a "transparent proxy" is performed, whereby a direct mode browser is transparently forced to use a proxy server.) If the URL is determined to be restricted, in operation 564 a reply is sent to the browser causing it to be redirected to a pre-designated redirection URL, e.g., a splash or login page. If in operation 568 the user decides to login and is successful, then login support may begin in operation 572. If login is not successful, the user may be returned to operation 508.

The above steps may (and usually do) occur repeatedly, by one or more software applications acting as web browsers. Thus both redirection and access controlled pre-login free access are supported for direct mode browsers. Pre-login free access can be highly desirable in some configurations, and the user may never feel the need to login.

Login Phase

Figure 5C:
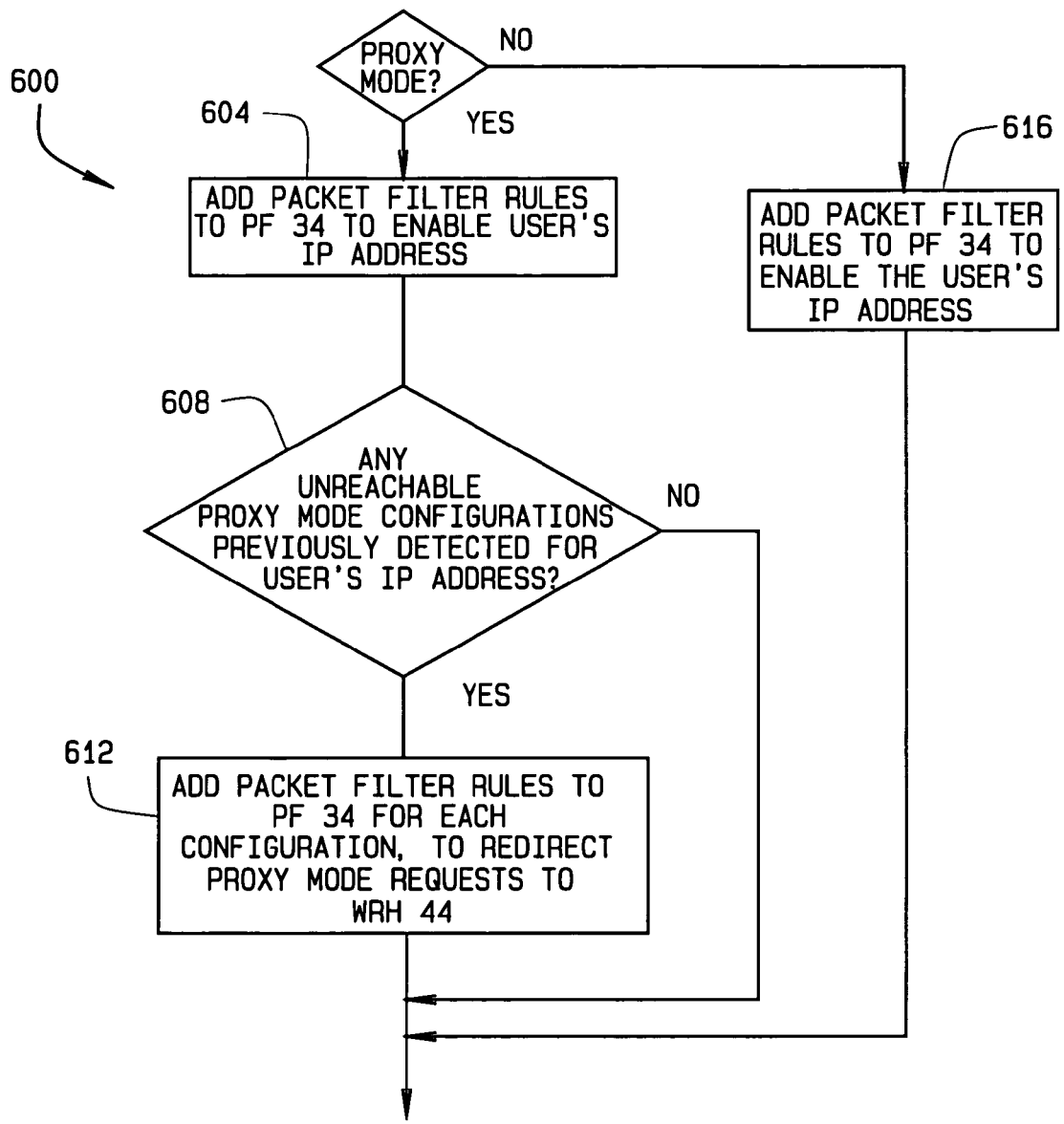
FIG. 5C illustrates exemplary operations included in a login support method in accordance with one implementation of the invention.

A login phase may begin where a user logs in successfully. During the login phase, numerous operations may occur, the last of which may be to enable network access for the user (which at a network level means the IP address of the user.) An exemplary login support method is indicated generally in FIG. 5C by reference number 600. If the browser is configured as a proxy mode browser, then in operation 604, packet filter rules are added to PF 34 to enable the IP address of the user. If in operation 608 any non-reachable proxy mode configurations were previously detected for this IP address, packet filter rules are added in operation 612 to PF 34 for each configuration. These rules can redirect proxy mode requests from the user's IP address to Web Request Handler 44, which provides post-login support for proxy mode configurations.

If the browser is configured as a direct mode browser, then in operation 616, packet filter rules applicable to direct mode are added to PF 34 to enable the IP address of the user.

Post-Login Phase

In some implementations WRH 44 handles all proxy mode web requests for post-login users. PF 34 rules intercept each proxy mode request, and forward the request the WRH 44, which performs the web request on behalf of the browser, returning the response to the browser. Should the user ever need to exit and restart the browser in a post-login phase, Nameserver2 38 ensures that any non-public domain names previously used for proxy configurations will resolve by returning the same fake IP addresses that were returned the first time the domain names were queried. This allows the proxy mode handling packet filter rules added during the login phase to continue working. There is a pattern-matching capability in Nameserver2 that supports the ability to intelligently determine whether a newly requested domain name is in fact just another proxy server domain name. This feature can be used to provide some level of support for complex proxy configurations which involve multiple domain names for proxy servers. This also could support a browser using a proxy server domain name that was not used or detected during the pre-login phase.

VPN

Some users with laptops or forms of PEDs may decide to connect and login to a corporate network using VPN (virtual private network) software. Logging into a VPN is much like disconnecting from one network and re-connecting to another. For example, IP addresses change, DNS services change and browser behavior may change. When connected to a VPN, some users of the system 10, but not all, may need the original proxy configuration settings configured in the system 10 in order to use their web browsers. This is dependent, for example, on the type of VPN software, the tunneling mode and configuration of that software, the type of operating system the user has, and the type and version of browser the user is using.

Figure 6A:
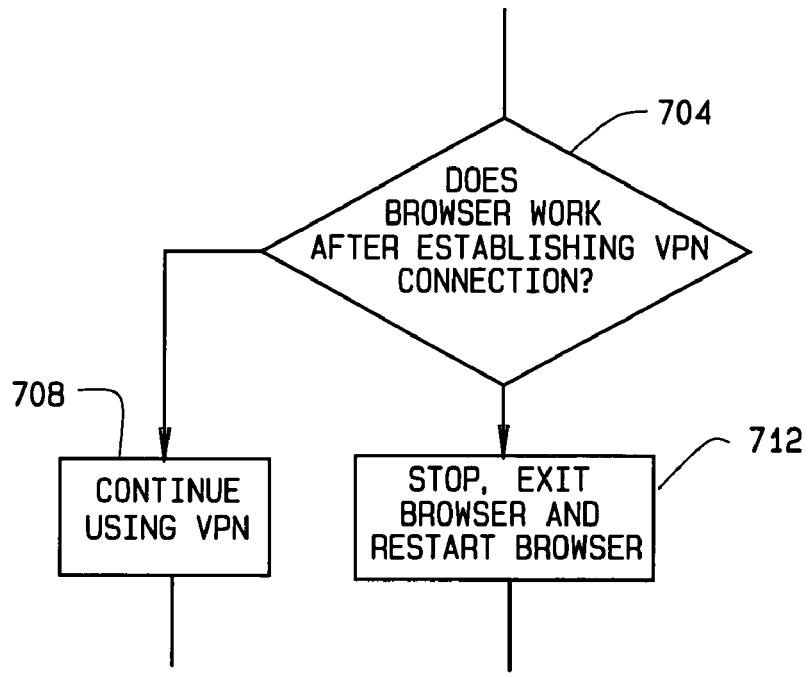
FIG. 6A illustrates exemplary steps after establishing a VPN connection in accordance with one implementation of the invention.

Referring specifically to FIG. 6A, as a general rule, the user may follow the following sequence of operations just after he/she has established a VPN connection. In step 704, without exiting and restarting his/her browser, the user tries to use his/her web browser that they were using prior to starting the VPN. If this operation proves successful, the user may continue using the VPN, as indicated in step 708. If this step proves unsuccessful, the user's browser will likely hang with no response after a reasonable length of time. In this instance, the user may stop the browser, exit and restart it, as indicated in step 712. This step encompasses exiting and restarting all browser windows that are open on the user's laptop or VPN. By exiting and restarting the browser, the proxy discovery process outlined above can begin again and the results will be appropriate for the user's corporate network, since they are virtually connected to their corporate network at this point.

Figure 6B:
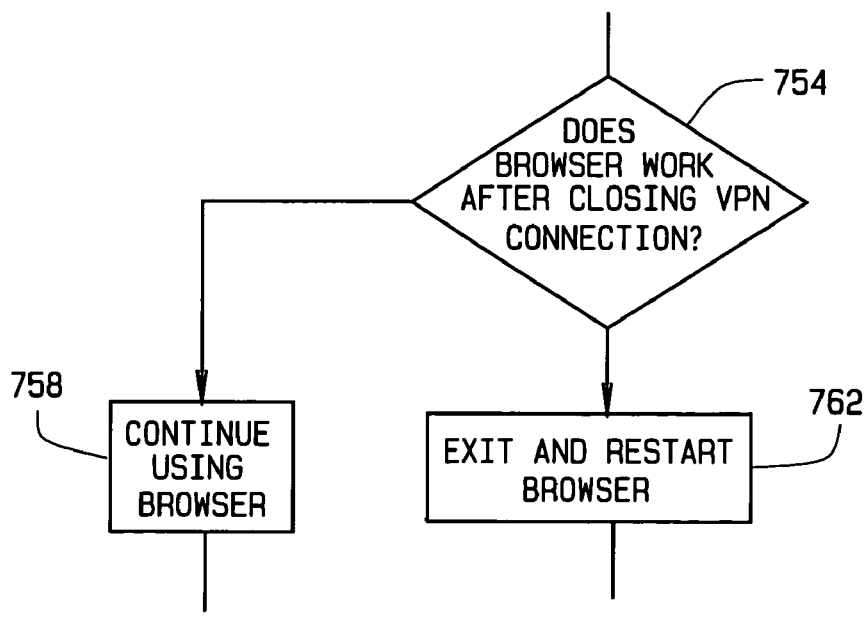
FIG. 6B illustrates exemplary steps after closing a VPN connection in accordance with one implementation of the invention.

Referring to FIG. 6B, when exiting the VPN connection, the browser may still be useable without exiting and re-starting it. If in step 754 the browser continues to work after closing the VPN connection, the user can continue in step 758 to use the network no longer being inside the VPN. The browser may hang because it has acquired proxy settings appropriate for the VPN and not for the local network. If the browser hangs, then the user in step 762 may exit the browser and restart it. Again, this involves closing all browser windows and restarting the browser. By exiting and restarting the browser, the proxy auto-configuration phase can begin again and the results will be appropriate for the original network (pre-VPN and post-login). Post-login proxy-mode handling software and Nameserver2 38 provide support for a previously detected (in pre-login) proxy-mode browser configuration at this point.

Post-Logout Phase

Proxy mode configuration support includes post-logout removal of packet filter rules that had been added to PF 34 during the login phase, as previously described, to support one or more proxy mode configurations.

As an aid in providing a more complete understanding and not for purposes of limitation, a summary description will be provided of various phases a client computer with one or more web browsers and/or web clients can go through when communicating to and through a gateway device. One complete pass through all these phases will be described below as a single session of using the local network controlled by the gateway device, even though some phases are optional depending on client configuration and/or user choice.

Pre-Login DNS Handling

Pre-login DNS (domain name service) handling can occur throughout the pre-login phase. Pre-login DNS features may be handled, for example, by Nameserver2 38.

Pre-Login MND Handling

Pre-login MND (mapped network drives) handling is employed so as to prevent a long delay before the browser enters the proxy auto configuration phase. As described above, Mapped Network Drives Handler 58 includes one or more software components designed to transparently spoof the MND servers, network protocols and services used and expected by the MND client software during pre-login.

This phase is optional and may be employed when MND are established in the client computer configuration. While a MND automount procedure could occur at any time after the client computer is on a network, MND handling can be especially beneficial just prior to proxy auto configuration. MND automount procedure has been observed to begin just prior to Microsoft's InternetExplorer® browser entering the proxy auto configuration phase.

Pre-Login Proxy Discovery

Detection of proxy mode configurations by WRH 42, and proxy discovery, can occur at any time during the pre-login phase. Usually this will happen only once for a given browser process prior to the browser performing its first web request. For some browsers, pre-login proxy discovery can happen when the browser starts up. But for other browsers, pre-login proxy discovery can occur just before the first requested external web page is sent over the network. If the browser is exited and restarted, proxy discovery begins again, whether pre-login or post-login. In the present implementation, proxy-mode configuration detection by WRH 42 occurs in the pre-login phase with support being provided at login time.

Pre-Login Redirect

Redirection of web clients and browsers can occur at any time during the pre-login phase.

Pre-Login Network Access (Without Redirect)

Pre-login network access without redirection may occur at any time during the pre-login phase. This can include selected free web services, local web portal access and/or maybe even some external web access, such as online help (text chat, frequently asked questions (FAQs), setup guides, etc.).

Login Support

During the login phase, packet filter rules are added that enable the user to access the upstream network in direct mode. Login support also pertains to operations for supporting proxy mode configurations, if any, detected during pre-login proxy mode discovery. Login support can include establishment of packet filter rules that are needed to support each proxy mode configuration.

Post-Login DNS Handling

Post-login DNS handling can occur throughout the post-login phase. Features of Nameserver2 can enable domain names that previously resulted in fake IP addresses to be later provided with those same fake IP addresses. This can be accomplished by using per client data storage to keep track of previously returned fake IP addresses. Nameserver2 software can recognize that a non-public domain name that was previously requested by a given user is now being re-requested by the same user and then provide the same fake IP address previously provided for that domain name.

Post-Login MND Handling

Post-login MND handling can occur at any time during the post-login phase, but especially during post-login if the browser is restarted. MND handling can occur similar to the manner in which it is handled during the pre-login MND handling phase described above.

Post-Login Proxy Discovery

Post-login proxy discovery can occur at any time during the post-login phase, but normally only during post-login if the browser is restarted. Nameserver2, PF 34, and PCRH are designed to support proxy discovery during the post-login phase.

Post-Login Support for Some Web Request Situations

Post-login support can be provided for some web request situations that may have resulted from the above-described pre-login phases pertaining to proxy discovery and redirection, due at least in part to fake IP addresses. Such support may include using "transparent proxy" for HTTP requests using fake IP addresses provided to browsers because of network timeouts or link-down situations, and not necessarily because the domain name was non-public.

As described above, when a fake IP address is supplied for a public domain name because of network timeouts and/or link-down conditions, Web Request Handler 44 can be employed. Web Request Handler 44 includes a web proxy server which can be used by post-login users. Packet filter 34 rules can cause an HTTP request to a fake IP address to be transparently proxied to the post-login web proxy server of Web Request Handler 44.

Post-Login in-VPN Establishment

This phase is entered when a logged-in user connects to a corporate network via a VPN (virtual private network). Depending on the type of VPN being used, a user's web browser may or may not continue to function without exiting and restarting it.

In-VPN DNS Handling

In-VPN DNS handling may occur throughout the in-VPN phase. For some tunneling modes of VPN software, this can be essentially the same as the post-login DNS handling phase referred to above. For other tunneling modes, all or some of the DNS queries may only be resolved by DNS servers within the VPN tunnel. After the VPN session has ended, if IP addresses obtained during the VPN session are unreachable outside the tunnel, the user may find it desirable to exit and restart the browser.

In-VPN MND Handling

In-VPN MND handling can occur at any time during the in-VPN phase, whether the browser is being restarted or not. As described above, Mapped Network Drives Handler 58 includes one or more software components designed to transparently spoof the MND servers, network protocols and services used and expected by the MND client software during pre-VPN phases, such as pre-login and post-login.

MND, however, may actually be present and available while the client computer is operating in-VPN. Accordingly, implementations of the invention may enable the MND automount process (MNDAP) to reach corporate servers while inside a VPN. This capability can be facilitated by the fact that DNS TTL values on fake IP addresses can be made relatively short, and also by the fact that requests to fake IP addresses can be rejected using an ICMP Network Unreachable error message, which is configured using a Packet Filter 34 rule.

In-VPN Proxy Discovery

In-VPN proxy discovery can occur at any time in the in-VPN phase when the browser is restarted. The browser may stop working after starting a VPN session, which may require the user to exit and restart the browser. Or, the user may just decide to exit and restart the browser for other reasons. In-VPN discovery, if performed, usually is handled by network services available only within the VPN tunnel. A result of performing this proxy discovery process may be a browser that functions correctly within the VPN tunnel, but does not function correctly after the VPN session has ended.

Post-VPN Support

Post-VPN support can be provided for those users who have logged out of the VPN but have not yet also logged out of the local network. This post-VPN support may be needed if the browser is restarted for no particular reason or restarted because the browser failed to function after exiting the VPN. Support for proxy configuration files and proxy mode configurations post-VPN is essentially the same as that for post-login.

Post-VPN MND Handling

After establishing the VPN, a user's browser may need to be exited and restarted. If so, the browser will also likely have to again be exited and restarted after the VPN session has ended. This means that the startup of the browser may cause the MND automount process to be executed again. But since the real MND are no longer available after exiting the VPN, Mapped Network Drives Handler 58 must again spoof the MND automount process as described above.

Post-VPN Proxy Discovery

After establishing the VPN, a user's browser may need to be exited and restarted. If so, the browser will also likely have to again be exited and restarted after the VPN session has ended. Startup of the browser can cause the web browser proxy discovery process to be executed again, and Nameserver2 will ensure that proxy-related domain name queries that previously resulted in fake IP addresses are provided with those same fake IP addresses. In this regard, a domain name to fake IP lookup table can be maintained, for example in a client-specific data collection area on the gateway device 30. Fake IP addresses can be stored or saved, for example, in a user-specific file that is uniquely associated with the browser for subsequent use by the browser should the browser be exited and restarted by a user operating the browser.

Logout Support

At logout, packet filter rules that allow access to the upstream network for the user are removed. Logout support also includes removing any proxy mode configurations, if any, established as packet filter rules in any phase in which pre-login proxy discovery was performed.

Some implementations of the foregoing systems and methods thus allow essentially transparent handling of a plurality of proxy mode configurations in browsers running on a user's laptop. Specifically, the network gateway device 30 recognizes and guides each browser running on a user's PED into a direct mode, or accommodates proxy mode access configuration during a pre-login phase of operation on the network, and also during a post-login phase of operation, provided such browsers make a URL request while the user is still in the pre-login phase of operation on the network. Accordingly, users are able to access a network available through the foregoing gateway without having to make manual changes to their web browser proxy configurations.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of redirecting a browser in a network, the method comprising:
   providing a fake IP address to the browser in response to an attempt to resolve a non-resolvable DNS query by the browser for a destination address;
   detecting a web request by the browser sent to the fake IP address; and
   redirecting the browser to a redirect address based on the detecting.

2. The method of claim 1, wherein redirecting the browser to a redirect address comprises redirecting the browser to one of the following: the destination address, a network portal, and a login page.

3. The method of claim 1, wherein the fake IP address is provided using a name server.

4. The method of claim 1, wherein the fake IP address is provided in a pre-login phase of the browser and the redirecting is performed in a post-login phase of the browser.

5. The method of claim 1, wherein detecting a web request by the browser comprises forwarding the web request to a web request handler.

6. The method of claim 5, wherein said forwarding is performed using a packet filter and said redirecting is performed using the web request handler.

7. The method of claim 1, further comprising:
   detecting a web request by the browser sent to a valid IP address; and
   redirecting the browser to a redirect address based on the detecting.

8. A method of redirecting a browser in a network, the method comprising:
   providing a fake IP address to the browser in response to an attempt to resolve a DNS query by the browser for a destination address;
   responding to one or more mapped drive mounting procedure requests associated with the fake IP address; and
   redirecting the browser to a redirect address based on the fake IP address.

9. The method of claim 8, wherein responding to one or more mapped drive mounting procedure requests comprises at least one of the following:
   sending a reject message in response to an echo request associated with a fake IP address; and
   spoofing a server management block request associated with the fake IP address.

10. The method of claim 8, wherein responding to one or more mapped drive mounting procedure requests comprises using packet filter rules.

11. The method of claim 8, performed during proxy discovery.

12. The method of claim 8, wherein the fake IP address is provided in a pre-login phase of the browser, and said redirecting step is performed in a post-login phase.

13. A method of redirecting a browser in a network, the method comprising:
   detecting when the browser makes an access request for a URL;
   determining whether the domain name in the URL is resolvable;
   determining whether a server represented by the domain name is reachable;
   defining a first parameter to indicate whether the domain name in the URL is resolvable;
   defining a second parameter to indicate whether the server represented by the domain name is reachable; and
   using at least one of the parameters in connection with redirecting the browser.

14. The method of claim 13, wherein said determining steps comprise parsing the address into at least a protocol name and a server name.

15. The method of claim 13, further comprising making the parameters available to at least one of the following: the browser, a web portal, and an authentication/authorization/accounting component of the network.

16. The method of claim 13, further comprising: including the parameters in the URL; and displaying the URL in a URL display area of the browser.

17. The method of claim 13, wherein using at least one of the parameters comprises selecting a redirect address for the browser based on the parameters.

* * * * *